(12) United States Patent  (10) Patent No.: US 9,189,530 B2
Asai et al.  (45) Date of Patent: Nov. 17, 2015

(54) INFORMATION PROCESSING DEVICE, COMPUTER-READABLE RECORDING MEDIUM, AND NODE EXTRACTION METHOD

(71) Applicant: FUJITSU LIMITED, Kawasaki-shi, Kanagawa (JP)

(72) Inventors: Etsuhisa Asai, Yokohama (JP); Harumichi Tabata, Numazu (JP); Machiko Ikoma, Yokohama (JP); Nozomi Watanabe, Odawara (JP)

(73) Assignee: FUJITSU LIMITED, Kawasaki (JP)

( * ) Notice: Subject to any disclaimer, the term of this patent is extended or adjusted under 35 U.S.C. 154(b) by 209 days.

(21) Appl. No.: 14/060,976

(22) Filed: Oct. 23, 2013

(65) Prior Publication Data

US 2014/0188785 A1  Jul. 3, 2014

(30) Foreign Application Priority Data

Dec. 28, 2012  (JP) ................................ 2012-288949

(51) Int. Cl.
*G06F 17/30* (2006.01)
(52) U.S. Cl.
CPC .... *G06F 17/30563* (2013.01); *G06F 17/30412* (2013.01); *G06F 17/30539* (2013.01); *G06F 17/30592* (2013.01)
(58) Field of Classification Search
None
See application file for complete search history.

(56) References Cited

U.S. PATENT DOCUMENTS

| | | | |
|---|---|---|---|
| 7,912,842 B1* | 3/2011 | Bayliss | 707/749 |
| 2001/0047290 A1* | 11/2001 | Petras et al. | 705/10 |
| 2002/0194159 A1 | 12/2002 | Kamath et al. | |
| 2005/0065756 A1 | 3/2005 | Hanaman et al. | |
| 2005/0165819 A1 | 7/2005 | Kudoh et al. | |
| 2006/0020662 A1* | 1/2006 | Robinson | 709/203 |
| 2006/0271568 A1 | 11/2006 | Balkir et al. | |
| 2010/0082427 A1* | 4/2010 | Burgener et al. | 705/14.49 |

FOREIGN PATENT DOCUMENTS

| | | |
|---|---|---|
| JP | 2005-202535 | 7/2005 |
| JP | 2010-49411 | 3/2010 |
| JP | 2010-205077 | 9/2010 |

OTHER PUBLICATIONS

Extended European Search Report dated Jun. 5, 2014 in corresponding European Patent Application No. 13190051.6.

(Continued)

*Primary Examiner* — Wilson Lee
(74) *Attorney, Agent, or Firm* — Staas & Halsey LLP

(57) ABSTRACT

A process includes selecting a node associated with an extracted node and a node associated with the node accepted by an acceptance unit accepting a node from nodes included in a node link obtained from text relating to a specific matter, accepting a first item in which a registered content of an analysis target is registered, from items in a table relating to the specific matter, accepting the registered content of the analysis target, a second item for use in calculating degrees of association between registered contents in the first item in the table and nodes; calculating the degrees of association between each of the registered content in the first item in the table and the nodes selected, according to a registered content in the second item in the table; and extracting a node associated with the analysis target from the selected nodes, according to the calculated degrees of association.

6 Claims, 25 Drawing Sheets

(56) References Cited

OTHER PUBLICATIONS

"General Information Manual for Interstage Navigator Explorer Server," URL: http:software.fujitsu.com/jp/manual/manualfiles/M060039/B1WN7811/02Z200/gai02/gai00013.html, obtained Jun. 15, 2012.

"General Information Manual for Interstage Navigator Server 8.0," URL: http:software.fujitsu.com/jp/manual/manualfiles/M060059/B1WN7601/03Z200/gaiaa/gai00086.html, obtained Jun. 15, 2012.

* cited by examiner

FIG.7

| ITEM | DEFINITION OF IDENTITY CONDITION | ITEM | DEFINITION OF IDENTITY CONDITION |
|---|---|---|---|
| REGION | UP TO ONE VALUE | SEX | UP TO ONE VALUE |
| STORE | UP TO THREE VALUES | PRODUCT | UP TO TWO VALUES |
| PERSON IN SALES | EXCLUDING OTHER RECORDS | SALES | DIFFERENCE OF 1000 OR LESS |
| MEMBERSHIP | NOT USED AS COMMON TERM | | |

FIG.11
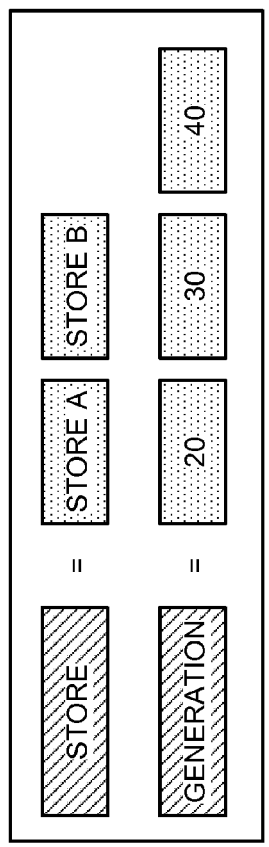
+
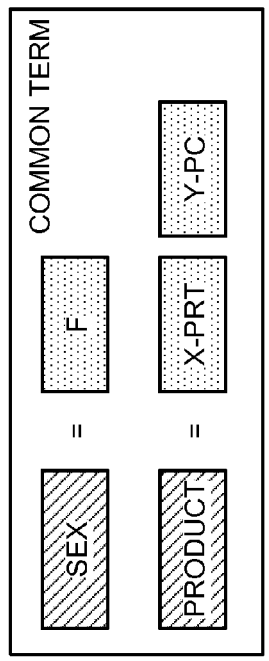

INFORMATION PROCESSING DEVICE, COMPUTER-READABLE RECORDING MEDIUM, AND NODE EXTRACTION METHOD

CROSS-REFERENCE TO RELATED APPLICATION

This application is based upon and claims the benefit of priority of the prior Japanese Patent Application No. 2012-288949, filed on Dec. 28, 2012, the entire contents of which are incorporated herein by reference.

FIELD

The embodiments discussed herein are related to information processing devices, node extraction programs, and node extraction methods.

BACKGROUND

There is a technique called text mining for analyzing the contents of text. For example, there is a node extraction technique by which the appearance frequency of a pair of nodes (content words or keywords) extracted from a plurality of text data by a morphological analyzer is set as degree of association, and a pair of nodes with a degree of association exceeding a predetermined value is extracted as a pair of associated nodes. By the use of the foregoing technique, a node link is generated such that the higher the degrees of association between extracted pairs of nodes become, the shorter the distances between the nodes become, and the generated node link is displayed. This allows a user to understand the feature of the entire text and visually grasp the degree of association between the nodes.

In addition, there is another technique called OLAP (online analytical processing) for subjecting data registered in a table of a DWH (data warehouse) to multi-dimensional analyses. The OLAP is intended to extract from data, a dimension in which the data is classified into a hierarchical structure (an item set on an axis) and numerical data included in the data, and subject the extracted data to multi-dimensional analyses using methodologies such as "slicing," "dicing," and "drill-down." The "slicing" is a process for subjecting analysis results to more detailed analysis on an axis with a new dimension. The "dicing" is a process for analyzing data in a different dimension (aspect). The "drill-down" is a process for subjecting data to more detailed analysis in a more detailed dimension.

Patent Literature 1: Japanese Laid-open Patent Publication No. 2010-205077
Patent Literature 2: Japanese Laid-open Patent Publication No. 2010-49411
Patent Literature 3: Japanese Laid-open Patent Publication No. 2005-202535
Non-Patent Literature 1: "General Information Manual for Interstage Navigator Explorer Server," [online], [searched on Jun. 15, 2012], the Internet <http:software.fujitsu.com/jp/manual/manualfiles/M060039/B1 WN7811/02Z200/gai02/gai00013.html>
Non-Patent Literature 2: "General Information Manual for Interstage Navigator Server 8.0," [online], [searched on Jun. 15, 2012], the Internet <http:software.fujitsu.com/jp/manual/manualfiles/M060059/B1 WN7601/03Z200/gaiaa/gai00086.html>

In some cases, a user may extract from a node link displayed through the foregoing technique for displaying a node link, a node group associated with a specific node and associated with a specific analysis target, by his/her experience or instinct. One example of such extraction by a user will be described. FIG. 26 is a diagram illustrating one example of an operation performed by a user. The example of FIG. 26 provides a node link 90 produced from responses to a plurality of questionnaires from persons who purchased electronic devices such as printers or personal computers in any of three districts, that is, Tobu District, Chubu District, and Seibu District. When the node link 90 illustrated in the example of FIG. 26 is displayed, if a user wishes to search for nodes specific to Tobu District with high degrees of association with the node "hot-selling" possibly inspiring consumers' buying motivation, based on the node link 90 obtained from the questionnaire result, the user performs the following operation. Specifically, the user selects a node group related to the node "hot-selling" and specific to Tobu District as an analysis target by his/her experience or instinct.

However, the user selects a node group by his/her experience or instinct, and thus there are cases where the selected node group is not associated with a specific node or an analysis target.

If a huge number of nodes are included in the node link, it takes enormous time for the user to manually select from the huge number of nodes a node group associated with a specific node and an analysis target.

SUMMARY

According to an aspect of an embodiment, an information processing device includes a memory; and a processor coupled to the memory. The processor executes a process. The process includes selecting a node associated with an extracted node and a node associated with the node accepted by an acceptance unit accepting a node from nodes included in a node link obtained from text relating to a specific matter, accepting a first item in which a registered content of an analysis target is registered, from items in a table relating to the specific matter, accepting the registered content of the analysis target, a second item for use in calculating degrees of association between registered contents in the first item in the table and nodes; calculating the degrees of association between each of the registered content in the first item in the table and the nodes selected, according to a registered content in the second item in the table; and extracting a node associated with the analysis target from the selected nodes, according to the calculated degrees of association.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating one example of identity conditions;

FIG. 11 is a diagram for describing one example of a process executed by the specification unit;

DESCRIPTION OF EMBODIMENT

Preferred embodiments of the present invention will be explained with reference to accompanying drawings.

However, the examples do not limit the disclosed technique.

[a] Example 1

Example of configuration of system 10

Figure 1:
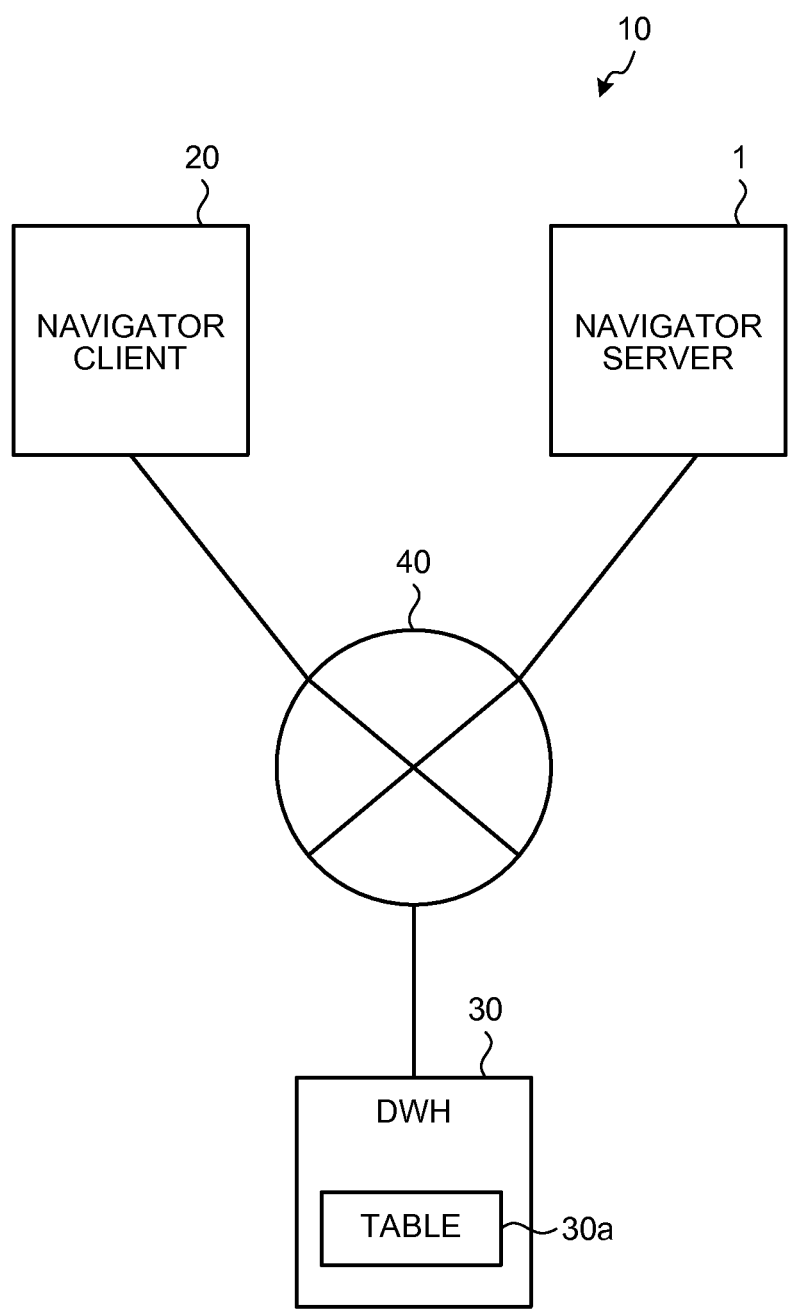
FIG. 1 is a diagram illustrating a system according to example 1.

Descriptions will be given as to a system to which a navigator server according to example 1. FIG. 1 is a diagram illustrating a system according to example 1. As illustrated in FIG. 1, a system 10 has a navigator server 1, a navigator client 20, and a DWH 30. The navigator server 1, the navigator client 20, and the DWH 30 are connected together via a network 40. That is, the navigator server 1, the navigator client 20, and the DWH 30 can communicate with each other. In the following description, the navigator server 1 will be abbreviated as server 1, and the navigator client 20 as client 20.

Figure 2:
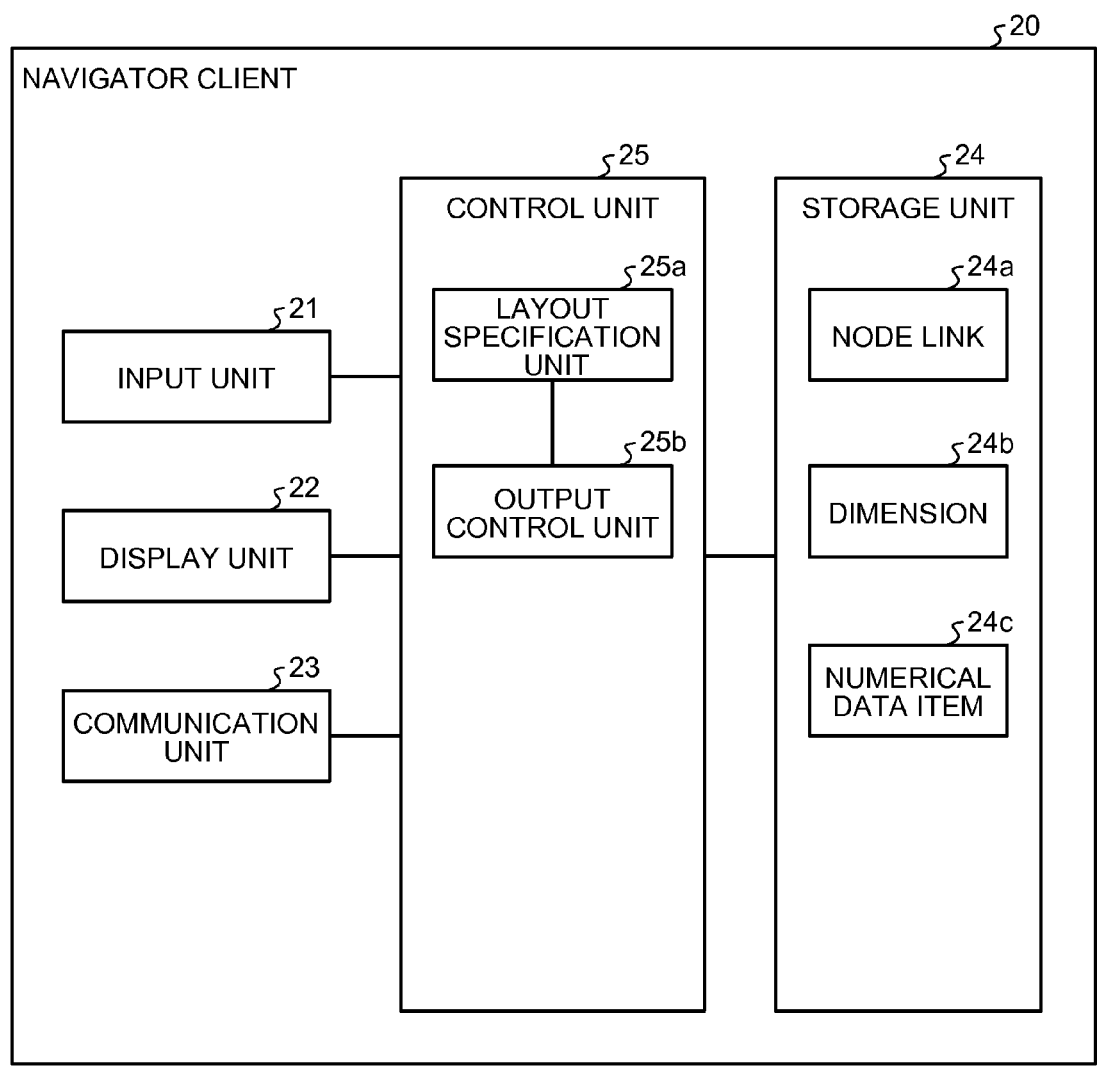
FIG. 2 is a diagram illustrating one example of a functional configuration of a client.

A functional configuration of the client 20 will be described. FIG. 2 is a diagram illustrating one example of a functional configuration of the client 20. As illustrated in FIG. 2, the client 20 has an input unit 21, a display unit 22, a communication unit 23, a storage unit 24, and a control unit 25.

The input unit 21 accepts user operations and sends the contents of the accepted operations to the control unit 25. The input unit 21 includes devices for accepting user operations such as a mouse and a keyboard, for example.

The display unit 22 displays various kinds of information. For example, the display unit 22 displays a layout specification screen described later under control of an output control unit 25b described later. The display unit 22 is a display device such as a liquid crystal display, for example.

The communication unit 23 is an interface for communicating with the server 1 and the DWH 30. For example, when receiving from the control unit 25 the contents of items specified on the layout specification screen described later and the registered contents of an analysis target, the communication unit 23 performs the following process. Specifically, the communication unit 23 sends the received specified contents of items on the layout specification screen and registered contents of an analysis target to the server 1 via the network 40.

The storage unit 24 stores various kinds of information. For example, the storage unit 24 stores a node link 24a, a dimension 24b, and a numerical data item 24c, for example.

Figure 3:
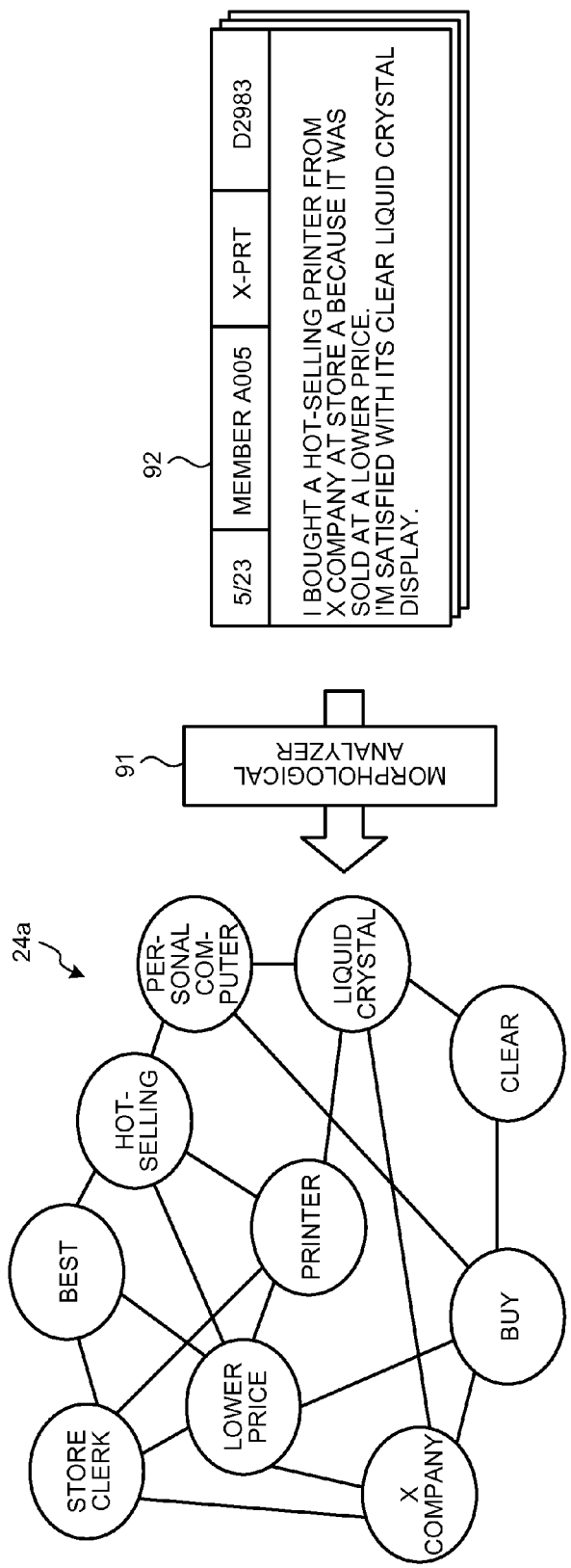
FIG. 3 is a diagram for describing one example of a method for generating a node link.

The node link 24a is generated on the basis of questionnaires. For example, the node link 24a is generated by a morphological analyzer. FIG. 3 is a diagram for describing one example of a method for generating a node link. As illustrated in FIG. 3, a morphological analyzer 91 extracts nodes from responses to a plurality of questionnaires 92 from persons who purchased electronic devices such as printers or personal computers in any of three districts, that is, Tobu District, Chubu District, and Seibu District. Then, the morphological analyzer 91 sets the appearance frequencies of extracted nodes in pairs as the degrees of association, and extracts pairs of nodes with degrees of association exceeding a predetermined value as pairs of associated nodes. Subsequently, the morphological analyzer 91 generates the node link 24a such that the higher the degrees of association between extracted pairs of nodes become, the shorter the distances between the nodes become. In this manner, the node link 24a is generated.

In the example, the morphological analyzer 91 generates the node link 24a including link attributes and record attributes of the nodes. The link attributes refer to a node group associated with nodes, for example. For instance, the node "printer" in the node link 24a in the example of FIG. 3 is associated with four nodes "hot-selling," "store clerk," "lower price," and "liquid crystal." Thus, as link attributes of the node "printer," a group of nodes "hot-selling," "store clerk," "lower price," and "liquid crystal" are included in the node link 24a. The record attributes refer to slip numbers of the questionnaires 92 in which the nodes are described in answer columns, for example. The slip numbers are registered in the item "slip number" of each record in a table 30a, as described later. Thus, when a record attribute is defined for each node, the node and the record in the table 30a are associated with each other. One or more slip numbers are defined as record attribute for one node.

The questionnaires 92 each include the date of product purchase, the membership number, the product number of the purchased product, the slip number on the purchase slip of the product, and answers to questions, as illustrated in the example of FIG. 3. For instance, in the example of FIG. 3, the questionnaire 92 indicates that a customer with membership number "A005" purchased a product with product number "X-RPT" on May 23, and the slip number of the purchase slip is "D2983." In the example of FIG. 3, the questionnaire 92 also includes the purchaser's comment "I bought a hot-selling printer from X Company at store A because it was sold at a lower price. I'm satisfied with its clear liquid crystal display."

Figure 4:
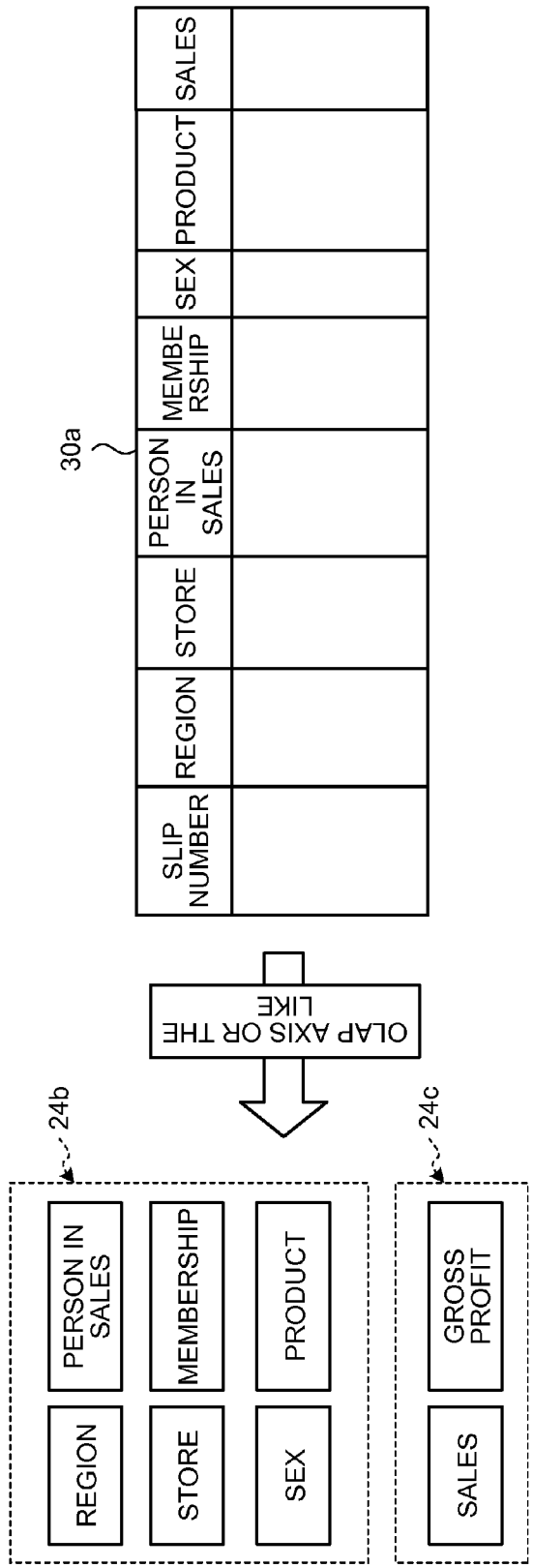
FIG. 4 is a diagram for describing one example of a method for generating a dimension.

The dimension 24b is an item as an aspect of data analysis. The dimension 24b is generated from the table 30a in the DWH 30. FIG. 4 is a diagram for describing one example of a method for generating a dimension. The table 30a for use in generation of the dimension 24b will be described. The table 30a illustrated in the example of FIG. 4 has registered data relating to product purchase. The table 30a illustrated in the example of FIG. 4 has items "slip number," "region," "store," "person in sales," "membership," "sex," "product," and "sales." Registered in the item "slip number" are slip numbers of purchase slips for purchased products. Registered in the item "region" is information indicative of regions in which stores of product purchase are located. Registered in the item "store" is information indicative of stores of product purchase. Registered in the item "person in sales" are IDs of persons in sales at the stores. Registered in the item "membership" are IDs of members having purchased products. Registered in the item "sex" is information indicative of the sex of the members having purchased products. Registered in the item "product" are the product numbers of the products purchased by the members. Registered in the item "sales" are the prices of the purchased products. In addition, although not illustrated in the example of FIG. 4, the table 30a also includes other items. For example, the table 30a includes the item "generation" in which the generations of the members having purchased the products are registered. The table 30a also includes the item "gross profit" in which the gross profits of the products purchased by the members are registered.

As illustrated in the example of FIG. 4, an OLAP technique or the like is used to extract the dimension 24b as items constituting aspects of data analysis from the items in the table 30a. In the example of FIG. 4, the dimension 24b includes the items "region," "store," "person in sales," "membership," "sex," and "product."

The numerical data item 24c is an item in which numerical data capable of being summarized is registered. As illustrated in the example of FIG. 4, an OLAP technique or the like is used to extract the numerical data item 24c from the items in the table 30a. In the example of FIG. 4, the numerical data item 24c includes the items "sales" and "gross profit."

Returning to FIG. 2, the storage unit 24 is a semiconductor memory element such as a flash memory, or a storage device such as a hard disk or an optical disk. However, the storage unit 24 is not limited to the foregoing kinds of storage devices, but may be a random access memory (RAM) or a read only memory (ROM).

The control unit 25 has an internal memory for storing programs and control data describing various kinds of process procedures, and executes various processes according to these programs and data. As illustrated in FIG. 2, the control unit 25 has a layout specification unit 25a and an output control unit 25b.

Figure 5:
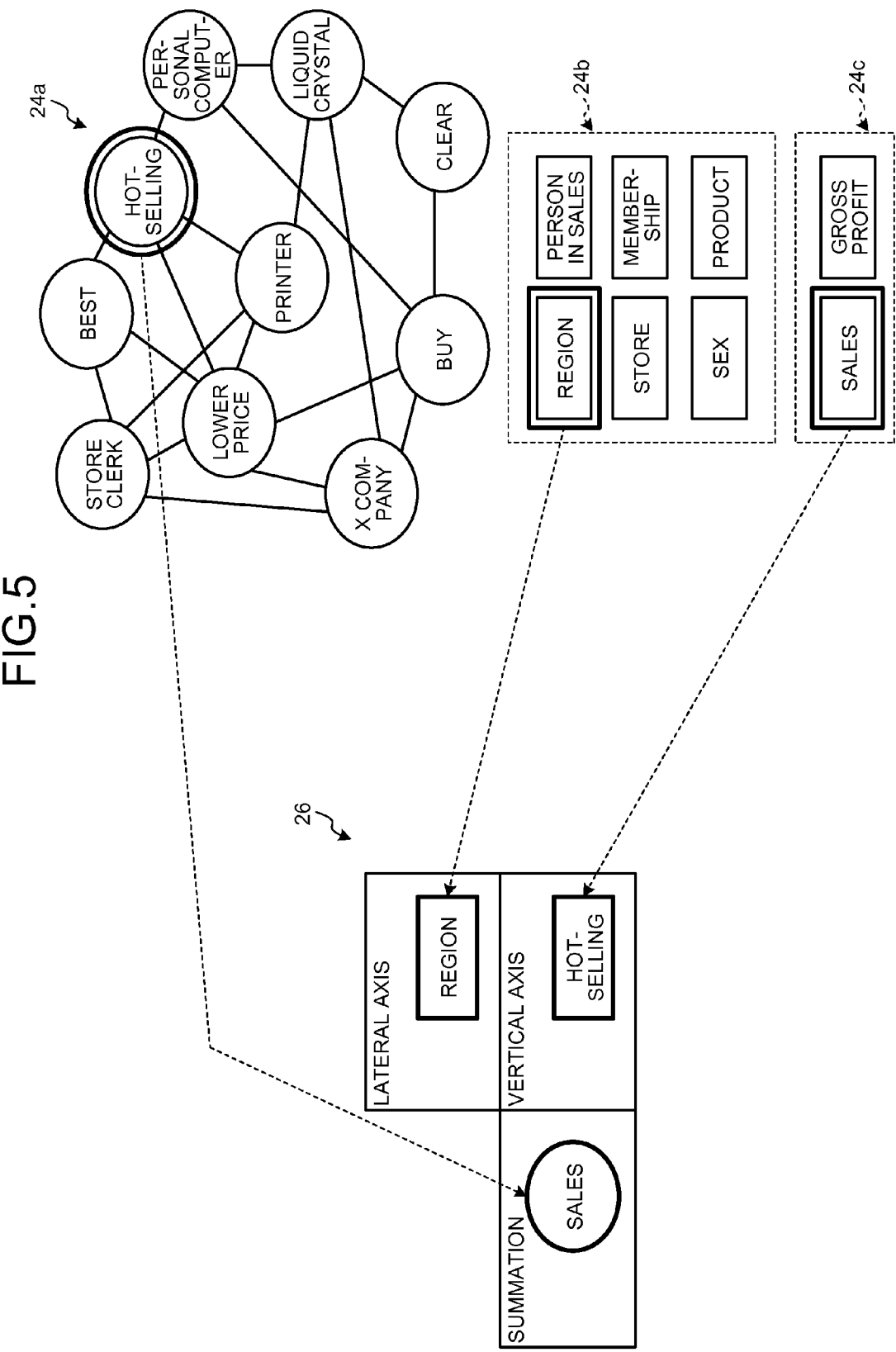
FIG. 5 is a diagram for describing one example of a process executed by a layout specification unit.

The layout specification unit 25a causes the display unit 22 to display a layout specification screen, and acquires the contents of settings in the items on the layout specification screen. Referring to FIG. 5, one example of a process executed by the layout specification unit 25a will be described. FIG. 5 is a diagram for describing one example of a process executed by the layout specification unit. The layout specification unit 25a first acquires the node link 24a, the dimension 24b, and the numerical data item 24c from the storage unit 24. Then, the layout specification unit 25a controls the display unit 22 to display a layout specification screen 26, the node link 24a, the dimension 24b, and the numerical data item 24c as illustrated in the example of FIG. 5.

As illustrated in the example of FIG. 5, the layout specification screen 26 has items "vertical axis," "lateral axis," and "summation" specified by the user. Specified by the user in the item "vertical axis" is a node as an analytic view out of a plurality of nodes included in the node link 24a. Specified by the user in the item "lateral axis" is an item as an analysis target constituting an aspect of analysis, that is, as an analytic axis, out of the plurality of items included in the dimension 24b. Specified by the user in the item "summation" is an item to be summarized in analysis of contents indicated by the node specified in the item "vertical axis," out of the plurality of items included in the numerical data item 24c.

For example, when the user wishes to "search for a node having a high degree of association with the node "hot-selling" possibly inspiring consumers' buying motivation and specific to Tobu District, based on the node link 24a obtained according to the results of the questionnaires" as described above, the user performs the following operation. Specifically, as illustrated in the example of FIG. 5, the user specifies the node "hot-selling" for the "vertical axis," the item "district" for the "lateral axis," and the item "sales" for the "summation."

Then, the layout specification unit 25a determines whether contents corresponding to all the items "vertical axis," "lateral axis," and "summation" are specified by the user in the items. When no contents are specified, the layout specification unit 25a makes the same determination. Meanwhile, when contents are specified, the layout specification unit 25a controls the display unit 22 to display the registered contents of the item specified in "lateral axis" in the table 30a. For example, the layout specification unit 25a inquires the DWH 30 about the registered contents of the item "region" specified in the "lateral axis," and controls the display unit 22 to display the registered contents of "Tobu," "Chubu," and "Seibu" obtained as a result of the inquiry.

When the registered contents are displayed on the display unit 22, the user specifies the registered content of an analysis target out of the displayed registered contents. For example, when the user has the foregoing wish, the user performs the following operation. Specifically, of the displayed contents "Tobu," "Chubu," and "Seibu," the user specifies the registered content "Tobu" of the analysis target.

Then, the layout specification unit 25a determines whether the registered content of the analysis target is specified by the user. When the registered content is not specified, the layout specification unit 25a makes the same determination. Meanwhile, when the registered content is specified, the layout specification unit 25a transmits to the communication unit 23 the contents specified in the items "vertical axis," "lateral axis," and "summation" on the layout specification screen 26 and the specified registered content of the analysis target, together with an instruction for transmission to the server 1. Accordingly, the communication unit 23 transmits the contents specified in the items "vertical axis," "lateral axis," and "summation" on the layout specification screen 26 and the specified registered content of the analysis target, to the server 1 via the network 40. For example, as illustrated in the example of FIG. 5, when the node "hot-selling," the item "region," and the item "sales" are specified by the user in the items "vertical axis," "lateral axis," and "summation," and the registered content "Tobu" of the analysis target is specified by the user, the layout specification unit 25a performs the following process. Specifically, the layout specification unit 25a transmits to the communication unit 23 the specified node "hot-selling," the item "region," and the item "sales" and the registered content "Tobu" of the analysis target, together with an instruction for transmission to the server 1.

Then, the layout specification unit 25a determines whether a final summarized result described later is received from the server 1. When no result is received, the layout specification unit 25a makes the same determination.

As described above, the layout specification unit 25a accepts one of nodes included in the node link 24a obtained from text in the questionnaires 92 or the like on a specific matter such as product purchase. For example, the layout specification unit 25a accepts the node "hot-selling." The layout specification unit 25a also accepts, of the items in the table 30a in relation to a specific matter such as product purchase, an item in which the registered content of the analysis target is registered, for example, the item "region" in which the registered content "Tobu" of the analysis target is registered. The layout specification unit 25a also accepts the registered content of the analysis target. For example, the layout specification unit 25a accepts the registered content "Tobu" of the analysis target. The layout specification unit 25a also accepts, of the items in the table 30a, an item for use in calculating the degree of association between the registered content in the item in which the registered content of the analysis target is registered in the table 30a and the node. For example, the layout specification unit 25a accepts an item described below out of the items in the table 30a. Specifically, the layout specification unit 25a accepts the item "sales" for use in calculating the degrees of association between the registered contents "Tobu," "Chubu," and "Seibu" in the item "region" in the table 30a in which the registered content "Tobu" of the analysis target is registered and the node.

The output control unit 25b outputs various kinds of information. For example, when the layout specification unit 25a determines that the final summarized result described later is received from the server 1, the output control unit 25b controls the display unit 22 to display the received final summarized result.

The control unit 25 is an integrated circuit such as an application specific integrated circuit (ASIC). The control unit 25 may also be a field programmable gate array (FPGA). The control unit 25 may also be an electronic circuit such as a central processing unit (CPU). The control unit 25 may also be a micro processing unit (MPU).

Returning to FIG. 1, the DWH 30 has the table 30a described above. The DWH 30 receives an SQL sentence transmitted from the server 1, searches the table 30a for corresponding records based on the received SQL sentence, summarizes the records obtained as a result of the search, and transmits the summarized result to the server 1.

Figure 6:
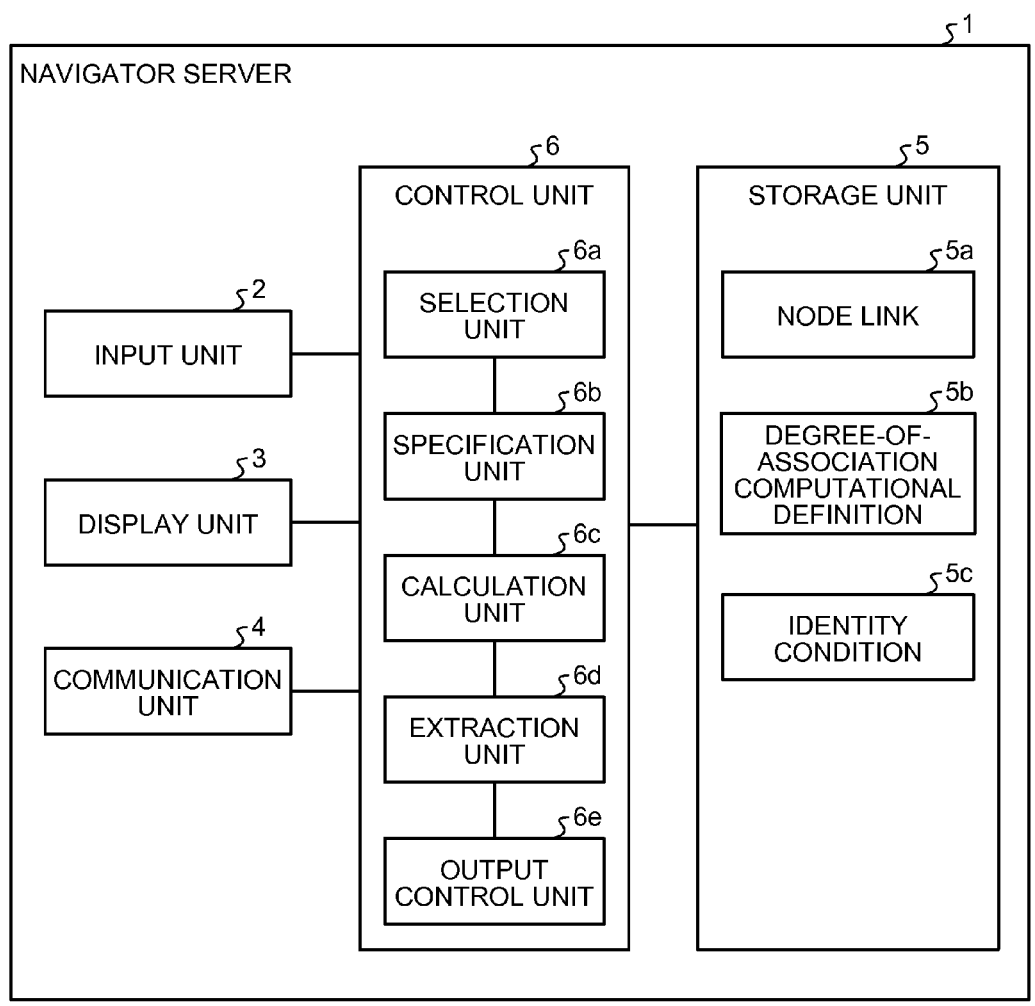
FIG. 6 is a diagram illustrating one example of a functional configuration of a server.

The server 1 extracts nodes associated with the node in the item "vertical axis" specified by the user of the client 20 and associated with the registered content "Tobu" of the analysis target, and transmits the extracted result to the client 20. A functional configuration of the server 1 will be described. FIG. 6 is a diagram illustrating one example of a functional configuration of the server. As illustrated in the example of FIG. 6, the server 1 has an input unit 2, a display unit 3, a communication unit 4, a storage unit 5, and a control unit 6.

The input unit 2 is used to input various kinds of information to the control unit 6. For example, the input unit 2 accepts various kinds of operations from an administrator of the server 1 or the like, and inputs the contents of the accepted operations to the control unit 6. The input unit 2 is a device such as a keyboard or a mouse, for example.

The display unit 3 displays various kinds of information. For example, the display unit 3 displays an image indicating operational status of the server 1. The display unit 3 is a display device such as a display, for example.

The communication unit 4 is an interface for communicating with the client 20 and the DWH 30. For example, when receiving contents specified in the items "vertical axis," "lateral axis," and "summation" on the layout specification screen 26 and the registered content of an analysis target from the client 20, the communication unit 4 performs the following process. Specifically, the communication unit 4 transmits the contents specified in the items "vertical axis," "lateral axis," and "summation" on the layout specification screen 26 and the registered content of the analysis target to the control unit 6. When receiving an SQL sentence described later from the control unit 6, the communication unit 4 transmits the received SQL sentence to the DWH 30 via the network 40. When receiving a response to the SQL sentence from the DWH 30, the communication unit 4 transmits the received response to the control unit 6. When receiving a final summarized result described later from the control unit 6, the communication unit 4 transmits the received final summarized result to the client 20.

In other words, the communication unit 4 accepts one of the nodes included in the node link 24a obtained from text in the questionnaires 92 or the like on a specific matter such as product purchase. For example, the communication unit 4 accepts the node "hot-selling." Then, the communication unit 4 transmits the accepted node to the control unit 6. The communication unit 4 also accepts, of the items in the table 30a in relation to a specific matter such as product purchase, an item in which the registered content of the analysis target is registered. For example, the communication unit 4 accepts the item "region" in which the registered content "Tobu" of the analysis target is registered. Then, the communication unit 4 transmits the accepted item to the control unit 6. The communication unit 4 also accepts the registered content of the analysis target. For example, the communication unit 4 accepts the registered content "Tobu" of the analysis target. Then, the communication unit 4 transmits the accepted registered content of the analysis target to the control unit 6. The communication unit 4 also accepts, of the items in the table 30a, an item for use in calculating the degrees of association between the registered contents in the item in which the registered content of the analysis target is registered and the node. For example, the communication unit 4 accepts an item described below out of the items in the table 30a. Specifically, the communication unit 4 accepts the item "sales" for use in calculating the degrees of association between the registered contents "Tobu," "Chubu," and "Seibu" in the item "region" in the table 30a in which the registered content "Tobu" of the analysis target is registered and the node. Then, the communication unit 4 transmits the accepted item to the control unit 6. The communication unit 4 is one example of an acceptance part.

The storage unit 5 stores various kinds of information. For example, the storage unit 5 stores a node link 5a, a degree-of-association computational definition 5b, and an identity condition 5c.

The node link 5a is identical to the foregoing node link 24a.

The degree-of-association computational definition 5b indicates an algorithm for use in calculation of a degree of association by a calculation unit 6c described later. The degree-of-association computational definition 5b indicates an algorithm for calculating the ratio of a summarized value of items to be calculated in degree of association to an average value of all items of the summarized values, as degree of association.

The identity condition 5c is a definition of a condition as a common term for each of the items in the table 30a. FIG. 7 is a diagram illustrating examples of identity conditions. In the example of FIG. 7, the identity condition 5c for the item "sex," for instance, indicates that up to one kind of a registered value (information indicative of sex) is regarded as a common term. In addition, in the example of FIG. 7, the identity condition 5c or the item "product," for instance, indicates that up to two kinds of registered values (product numbers) are regarded as common terms.

Returning to FIG. 6, the storage unit 5 is a semiconductor memory element such as a flash memory, or a storage device such as a hard disk or an optional disk. The storage unit 5 is not limited to the foregoing kinds of storage devices, but may be a random access memory (RAM) or a read only memory (ROM).

The control unit 6 has an internal memory for storing programs and control data describing various kinds of processing procedures, and uses these programs and data to execute various processes. As illustrated in FIG. 6, the control unit 6 has a selection unit 6a, a specification unit 6b, a calculation unit 6c, and an extraction unit 6d, and an output control unit 6e.

Figure 8:
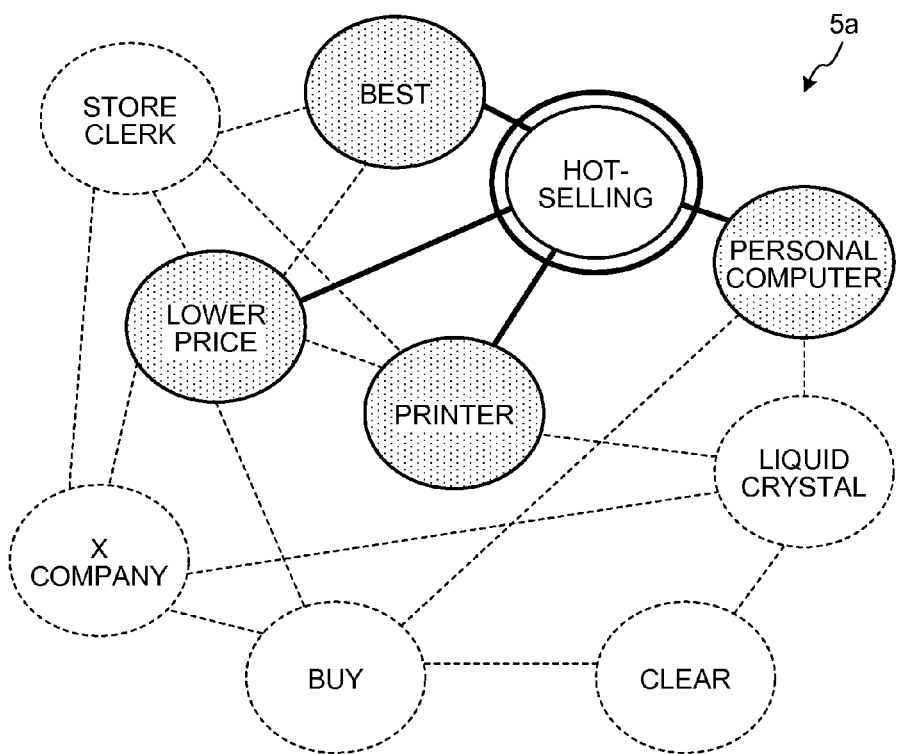
FIG. 8 is a diagram for describing one example of a process executed by a selection unit.

The selection unit 6a selects nodes associated with the foregoing node accepted by the communication unit 4 and nodes associated with the node extracted by the extraction unit 6d. A specific example of a process executed by the selection unit 6a will be described. FIG. 8 is a diagram for describing one example of a process executed by the selection unit. For example, when the communication unit 4 accepts the node "hot-selling," the selection unit 6a selects the nodes "best," "lower price," "printer," and "personal computer" adjacent to the node "hot-selling" in the node link 5a, as illustrated in FIG. 8. In the node link 5a, nodes adjacent to one node refer to nodes associated with the one node.

The specification unit 6b specifies an item satisfying a predetermined commonality between records with slip numbers (records in the table 30a) in the questionnaires 92 in which the node selected by the selection unit 6a is described in the answer column, as a common term. The specification unit 6b also specifies the registered contents of the specified common term.

In one mode, the specification unit 6b first determines whether, of the nodes selected by the selection unit 6a, there is any node of which the degree of association is not calculated by the calculation unit 6c described later. When there is any node of which the degree of association is not calculated, the specification unit 6b selects one unselected node from among the nodes selected by the selection unit 6a. For example, in the example of FIG. 8, the specification unit 6b selects the node "printer."

Then, the specification unit 6b determines whether any common term attribute is set to the selected node. At a point of time when the node link 5a is generated by the foregoing morphological analyzer 91, no common term attribute is set to the nodes in the node link 5a. Common term attributes are set to the nodes in a process performed by the specification unit 6b described later.

Figure 9:
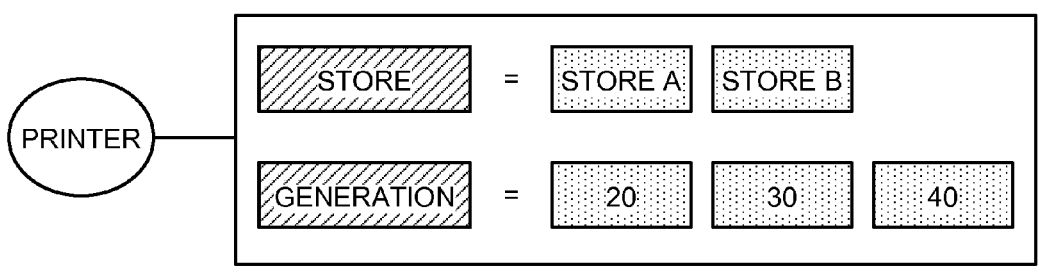
FIG. 9 is a diagram for describing one example of a process executed by a specification unit.

When any common term attribute is set to the selected node, the specification unit 6b specifies a common term (item and registered contents) indicated by the set common term attribute. A specific example of a process executed by the specification unit 6b will be described. FIG. 9 is a diagram for describing one example of a process executed by the specification unit. For instance, in the example of FIG. 9, a combination of the item "store" and the registered contents "store A" and "store B" of the item "store" is set to the node "printer" as a common term indicated by the set common term attribute. In the example of FIG. 9, as a common term indicated by the set common term attribute, a combination of the item "generation" and the registered contents "20," "30," and "40" of the item "generation" is also set to the node "printer." In the example of FIG. 9, since the common term attribute is set to the selected node "printer," the specification unit 6b specifies the combination of the item "store" and the registered contents "store A" and "store B" of the item "store" as a common term indicated by the set common term attribute. The specification unit 6b also specifies the combination of the item "generation" and the registered contents "20," "30," and "40" of the item "generation."

The specification unit 6b also determines whether there is any record with a slip number (record in the table 30a) in the questionnaire 92 in which the selected node is described in the answer column. For example, the specification unit 6b determines whether a slip number is registered in the item "slip number" of the questionnaire 92 in which the selected node is described in the answer column. Accordingly, the specification unit 6b determines whether there is any record with a slip number in the questionnaire 92 in which the selected node is described in the answer column. When there is a plurality of the questionnaires 92 in which the selected node is described in the answer column, the specification unit 6b makes the same determination on each of the questionnaires 92.

When there is any record with a slip number in the questionnaire 92 in which the selected node is described in the answer column, the specification unit 6b instructs the communication unit 4 to transmit to the DWH 30 the slip number in the questionnaire 92 in which the selected node is described in the answer column. Accordingly, the communication unit 4 transmits the slip number in the questionnaire 92 in which the selected node is described in the answer column, to the DWH 30 via the network 40. Upon receipt of the slip number, the DWH 30 searches the table 30a for a record with the received slip number, and transmits the record obtained as a result of the search to the server 1. Accordingly, the specification unit 6b of the server 1 can acquire the record with the slip number in the questionnaire 92 in which the selected node is described in the answer column.

Figure 10:
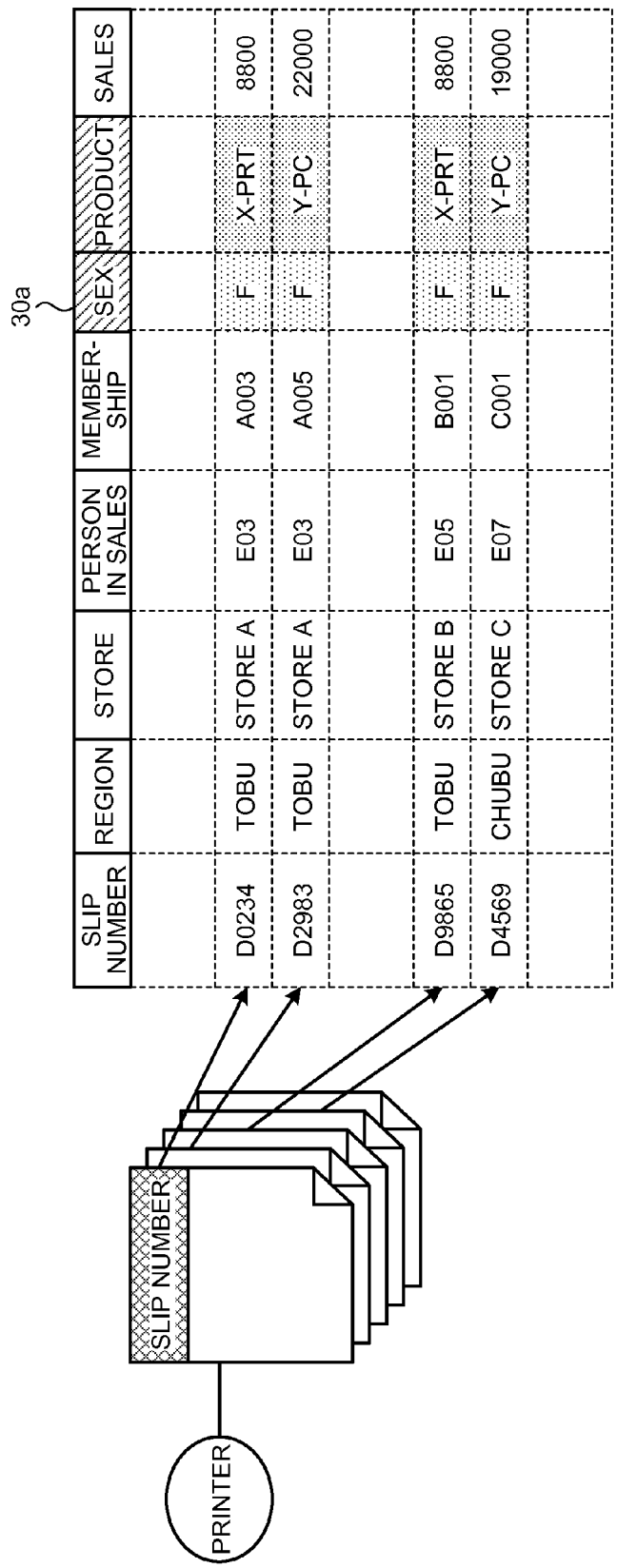
FIG. 10 is a diagram for describing one example of a process executed by the specification unit.

A specific example of a process executed by the specification unit 6b will be described. FIG. 10 is a diagram for describing one example of a process executed by the specification unit. In the example of FIG. 10, of the plurality of questionnaires 92 in which the selected node "printer" is described in the answer column, slip numbers "D0234," "D2983," "D9865," and "D4569" are included in four questionnaires, respectively. In this case, the specification unit 6b instructs the communication unit 4 to transmit the slip numbers "D0234," "D2983," "D9865," and "D4569" to the DWH 30. Accordingly, as illustrated in the example of FIG. 10, the specification unit 6b acquires four records with the slip numbers "D0234," "D2983," "D9865," and "D4569."

Subsequently, the specification unit 6b acquires the contents of the identity condition 5c corresponding to the items of the acquired records. For instance, it is assumed that the specification unit 6b acquires four records indicated in the example of FIG. 10 and the storage unit 5 stores the identity conditions 5c in the example of FIG. 7. In this case, the specification unit 6b acquires the identity condition 5c "up to one value" for the record item "region." The specification unit 6b also acquires the identity condition 5c "up to three values" for the record item "store." The specification unit 6b also acquires the identity condition 5c "excluding other records" for the record item "person in sales." The specification unit 6b also acquires the identity condition 5c "not used for common term" for the record item "membership." The specification unit 6b also acquires the identity condition 5c "up to one value" for the record item "sex." The specification unit 6b also acquires the identity condition 5c "up to two values" for the record item "product." The specification unit 6b also acquires the identity condition 5c "difference of 1000 or less" for the record item "sales."

Subsequently, the specification unit 6b selects one unselected item from among the acquired record items. For instance, in the example of FIG. 10, the specification unit 6b selects one unselected item from among the record items "region," "store," "person in sales," "membership," "sex," "product," and "sales."

Subsequently, the specification unit 6b determines whether the registered contents of all the acquired records in the selected item meet the corresponding identity condition 5c. For instance, it is assumed that the specification unit 6b acquires the four records in the example of FIG. 10 and the storage unit 5 stores the identity conditions 5c in the example of FIG. 7. In this case, when the record item "region" is selected, the specification unit 6b determines that the identity condition 5c "up to one value" is not met because all the registered contents of the four records in the item "region" are "Tobu" and "Chubu." Similarly, when any of the record items "store," "person in sales," "membership," and "sales" is selected, the specification unit 6b determines that the corresponding identity condition 5c is not met. Meanwhile, when the record item "sex" is selected, all the registered contents of the four records in the item "sex" are "F," the specification unit 6b determines that the identity condition 5c "up to one value" is met. Similarly, when the record item "product" is selected, all the registered contents of the four records in the item "product" are "X-PRT" and "Y-PC," and thus the specification unit 6b determines that the identity condition 5c "up to two values" is met.

When all the registered contents of the acquired records in the selected item meet the corresponding identity condition 5c, the specification unit 6b specifies a combination of the selected item and the registered contents of the selected item as a common term, and sets the determined common term as the common term attribute of the selected node. A specific example of a process executed by the specification unit 6b will be described. FIG. 11 is a diagram for describing one example of a process executed by the determination unit. For instance, it is assumed that the specification unit 6b selects the record item "sex" and determines that all the registered contents of the four records in the item "sex" meet the identity condition 5c "up to one value", as in the foregoing example. In this case, it is also assumed that the specification unit 6b selects the record item "product" and determines that all the registered contents of the four records in the item "product" meet the identity condition 5c "up to two values" as in the foregoing example. In such a case, as illustrated in the example of FIG. 11, the specification unit 6b adds as common terms a combination of the selected item "sex" and the registered content "F" and a combination of the selected item "product" and the registered contents "X-PRT" and "Y-PC." In the example of FIG. 11, a combination of the item "store" and the registered contents "store A" and "store B" in the item "store" is set in advance as a common term indicated by common term attributes. In addition, in the example of FIG. 11, a combination of the item "generation" and the registered contents "20," "30," and "40" in the item "generation" is also set as a common term indicated by common term attributes.

The specification unit 6b then determines whether there exists any unselected item. When any unselected item exists, the specification unit 6b performs again the foregoing process of selecting one unselected item. Then, the specification unit 6b performs again the foregoing processes subsequent to the process of selecting one unselected item.

Returning to FIG. 6, the calculation unit 6c calculates the degree of association as described below for each of the registered contents in the item in the table 30a in which the registered contents of the analysis target are registered, according to the registered content of the item in the table 30a for use in calculating the degrees of association in the table 30a. Specifically, the calculation unit 6c calculates the degree of association between the registered contents in the item in which the registered contents of the analysis target in the table 30a is registered and the node selected by the selection unit 6a. The calculation unit 6c also calculates the degree of association according to the registered contents in the item for use in calculating the degree of association included in the record including a common term specified by the specification unit 6b.

In one mode, the calculation unit 6c acquires from the DWH 30 the summarized value of the registered contents in the item for use in calculating the degree of association, the summarized value being obtained by summarizing the registered contents of the records (records in the table 30a) having the common terms specified by the specification unit 6b in the item of the analysis target. For example, it is assumed that the common terms specified by the specification unit 6b are a combination of the item "sex" and the registered content "F" and a combination of the selected item "product" and the registered contents "X-PRT" and "Y-PC." In this case, the calculation unit 6c acquires from the DWH 30 the summarized values of the registered contents in the item "sales" for use in calculating the degree of association, for each of the registered contents "Tobu," "Chubu," and "Seibu" of the records in the item "region" of the analysis target in the table 30a having the common terms.

For example, the calculation unit 6c generates an SQL sentence as illustrated below to be issued to the table 30a in the DWH 30. Specifically, the calculation unit 6c first generates a SELECT phrase in which the sum of the registered contents in the item for use in calculating the degree of association is designated as "SELECT." For example, when the item for use in calculating the degree of association accepted by the communication unit 4 is "sales," the calculation unit 6c generates a SELECT phrase "SELECT SUM (sales)."

Subsequently, the calculation unit 6c generates a WHERE phrase in which the common terms specified by the specification unit 6b are designated as "WHERE." For example, when the common terms specified by the specification unit 6b are a combination of the item "sex" and the registered content "F" and a combination of the selected item "product" and the registered contents "X-PRT" and "Y-PC," the calculation unit 6c generates a WHERE phrase as illustrated below. Specifically, the calculation unit 6c generates a WHERE phrase "WHERE sex="F" AND product="X-PRT" OR "Y-PC"."

Then, the calculation unit 6c generates a "GROUP BY" phrase in which the item of the analysis target is designated as "GROUP BY." For example, when the item of the analysis target accepted by the communication unit 4 is "region," the calculation unit 6c generates a "GROUP BY" phrase "GROUP BY region."

Subsequently, the calculation unit 6c generates other phrases, for example, a phrase "FROM table 30a." After that, the calculation unit 6c uses the generated SELECT phrase, WHERE phrase, "GROUP BY" phrase, and other phrases to generate a SQL sentence including the newly specified common term in the WHERE phrase.

The calculation unit 6c also determines whether any common term is specified by the specification unit 6b from the common term attribute set to the node. When any common term is specified, the calculation unit 6c generates a new WHERE phrase in which the common term specified by the specification unit 6b from the common term attribute set to the node is designated as "WHERE." For example, the calculation unit 6c generates a WHERE phrase "WHERE store="store A" OR "store B" AND generation="20" OR "30" OR "40"." After that, the calculation unit 6c uses the newly generated WHERE phrase, SELECT phrase, "GROUP BY" phrase, and other phrases to generate a new SQL sentence including the common term specified from the common term attribute set to the node in the WHERE phrase.

Then, the calculation unit 6c instructs the communication unit 4 to transmit each of the generated SQL sentences to the DWH 30. Accordingly, the communication unit 4 transmits the SQL sentence to the DWH 30 via the network 40, and thus the SQL sentences are issued to the DWH 30. Upon receipt of the SQL sentence, the DWH 30 searches the table 30a for corresponding records based on the received SQL sentence, summarizes the records obtained as a result of the search, and transmits the summarized result to the server 1. In this manner, the DWH 30 transmits the summarized result of each of the received SQL sentences to the server 1.

Figure 12:
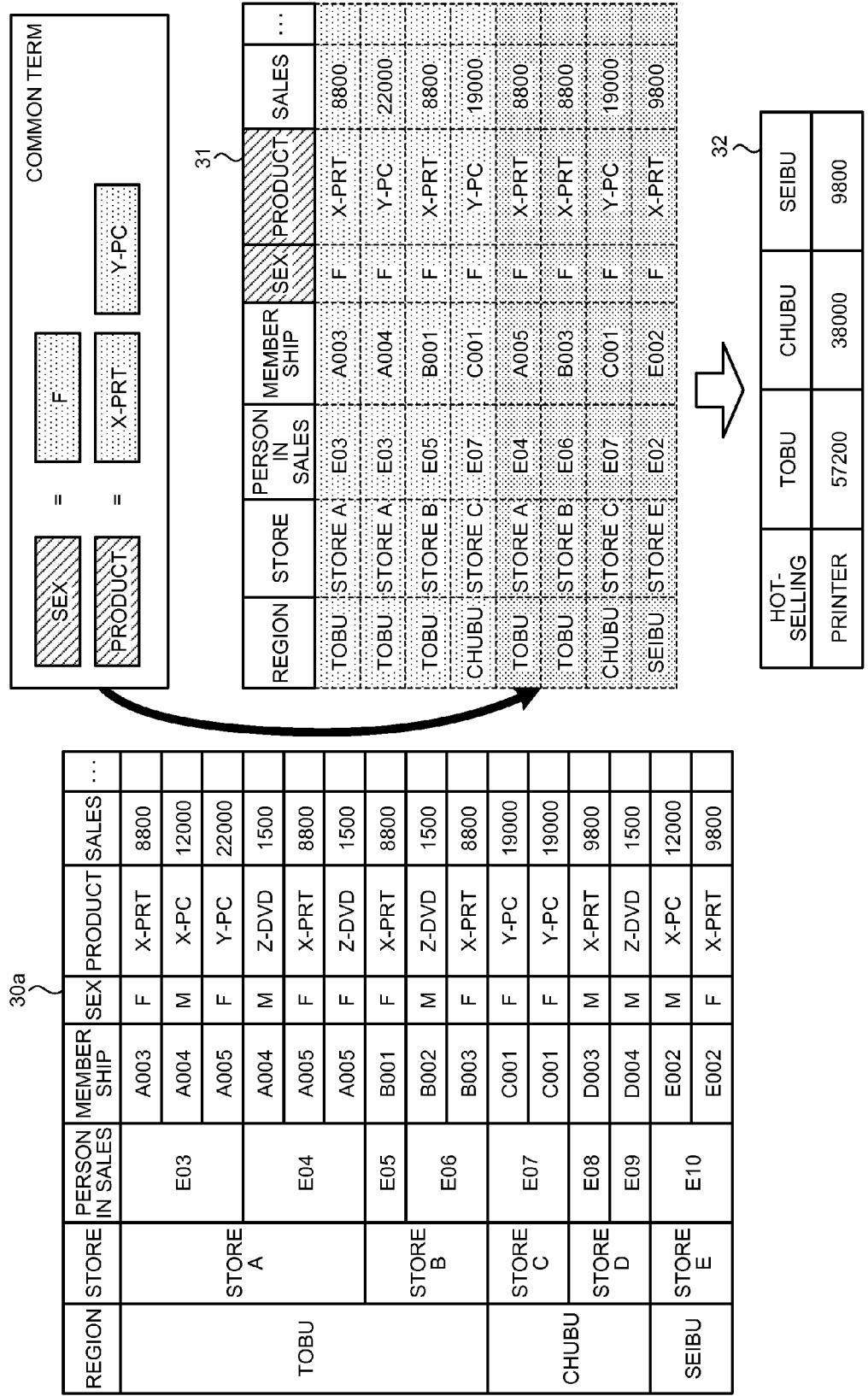
FIG. 12 is a diagram for describing one example of a process executed by a calculation unit.

For example, it is assumed that the SQL sentence "SELECT SUM (sales) FROM table 30a WHERE sex="F" AND product="X-PRT" OR "Y-PC" GROUP BY district" is issued to the DWH 30. FIG. 12 is a diagram for describing one example of a process executed by the calculation unit. FIG. 12 provides one example of the table 30a in the DWH 30. When the foregoing SQL sentence is issued to the DWH 30, the DWH 30 searches the table 30a for records based on the SQL sentence, and as a result, the DWH 30 obtains records 31 presented in the example of FIG. 12. Then, the DWH 30 summarizes the record 31 based on the SQL sentence to obtain summarized results 32 presented in the example of FIG. 12. Subsequently, the DWH 30 transmits the summarized results 32 to the server 1. Accordingly, it is possible to calculate the degrees of association described later with accuracy by extending records to be summarized to all persons having the attribute common to persons actually having described the word "printer" in the questionnaires.

Subsequently, the calculation unit 6c determines whether all summarized results corresponding to all the transmitted SQL sentences are received from the DWH 30. When all the summarized results are received, if the received summarized results are plural, the calculation unit 6c compiles the plurality of received summarized results into one.

Then, the calculation unit 6c acquires a degree-of-association computational definition 5b. Subsequently, the calculation unit 6c selects one unselected item from among the received summarized result (when a plurality of summarized results is received, the compiled summarized result). For example, when receiving the summarized result 32 presented in FIG. 12, the calculation unit 6c selects one unselected item from among the items "Tobu," "Chubu," and "Seibu" in the summarized result 32.

Then, the calculation unit 6c uses the algorithm indicated by the degree-of-association computational definition 5b to calculate the degree of association between the selected item and the selected node. For example, the calculation unit 6c uses an algorithm for calculating as degree of association the ratio of the summarized value in the item of which degree of association is to be calculated to the average of summarized values in all the items. In this case, the calculation unit 6c calculates the ratio of the summarized value in the selected item to the average of the summarized values in all the items, as the degree of association between the selected item and the selected node. For example, when receiving the summarized result 32 in the example of FIG. 12 and selecting the item "Tobu," the calculation unit 6c calculates a degree of association of "163%" between the "Tobu" and the "printer." Similarly, when receiving the summarized result 32 in the example of FIG. 12 and selecting the item "Chubu," the calculation unit 6c calculates a degree of association "of 109%" between the "Chubu" and the "printer." Similarly, when receiving the summarized result 32 in the example of FIG. 12 and selecting the item "Seibu," the calculation unit 6c calculates a degree of association of "28%" between the "Seibu" and the "printer."

Subsequently, the calculation unit 6c determines whether any unselected item exists in the items with the received summarized result. When there exists any unselected item, the calculation unit 6c performs again the foregoing process of selecting one unselected item from among the items with the received summarized result. Then, the calculation unit 6c performs again the foregoing processes subsequent to the process of selecting one unselected item. Meanwhile, when there is no unselected item, the calculation unit 6c determines whether there is any unselected node in the nodes selected by the selection unit 6a. When there is any unselected node, the specification unit 6b performs again the foregoing process of selecting one unselected node from the nodes selected by the selection unit 6a. Then, the specification unit 6b performs again the foregoing processes subsequent to the process of selecting one unselected node.

According to the degrees of association calculated by the calculation unit 6c, the extraction unit 6d extracts nodes associated with the analysis target, from the nodes selected by the selection unit 6a.

Figure 13:
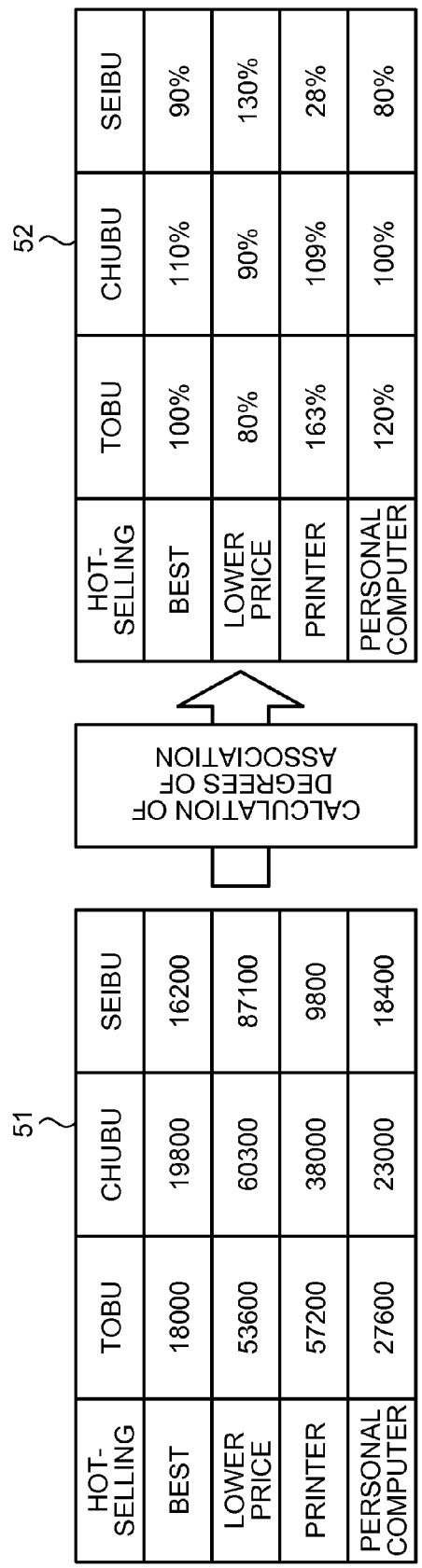
FIG. 13 is a diagram for describing one example of a process executed by an extraction unit.

For example, when the calculation unit 6c determines that no unselected node is included in the selected nodes, the extraction unit 6d specifies the highest degree of association out of the degrees of association between the nodes selected by the selection unit 6a and the registered contents of the analysis target. One example of the process executed by the extraction unit 6d will be described. FIG. 13 is a diagram for describing one example of a process executed by the extraction unit. FIG. 13 provides one example of degrees of association 52 calculated by the calculation unit 6c from summarized results 51 of the nodes "best," "lower price," "printer," and "personal computer" selected by the selection unit 6a and the items "Tobu," "Chubu," and "Seibu." With regard to the degrees of association 52 in the example of FIG. 13, the extraction unit 6d specifies the highest degree of association "163%" out of the degrees of association between the nodes "best," "lower price," "printer," and "personal computer" and the registered content "Tobu" of the analysis target.

Figure 14:
FIG. 14 is a diagram for describing one example of a process executed by the extraction unit.

Subsequently, the extraction unit 6d determines whether there is any degree of association specified earlier than the newly specified degree of association. When there is any degree of association specified earlier than the newly specified degree of association, the extraction unit 6d determines whether the newly specified degree of association is smaller than the previously specified degree of association. When the newly specified degree of association is equal to or more than the previously specified degree of association, the extraction unit 6d extracts a node corresponding to the newly specified degree of association, and adds records of the summarized result with the extracted node in the vertical axis and the item of the analysis target in the lateral axis to the beginning of the final summarized result. When there is no degree of association specified earlier than the newly specified degree of association, the extraction unit 6d also extracts a node corresponding to the newly specified degree of association, and adds records of summarized results with the extracted node in the vertical axis and the item of the analysis target in the lateral axis to the beginning of the final summarized result. FIG. 14 is a diagram for describing one example of a process executed by the extraction unit. For example, as illustrated in the example of FIG. 13, when specifying the highest degree of association "163%" out of the degrees of association between the nodes "best," "lower price," "printer," and "personal computer" and the registered content "Tobu" of the analysis target, the extraction unit 6d performs the following process. Specifically, the extraction unit 6d extracts the node "printer" corresponding to the newly specified degree of association "163%." In addition, as illustrated in the example of FIG. 14, the extraction unit 6d adds records of the summarized results 51 with the extracted item "printer" in the vertical axis and the registered contents "Tobu," "Chubu," and "Seibu" in the item of the analysis target in the lateral axis to the beginning of a final summarized result 60. Then, the selection unit 6a performs again the foregoing process of selecting nodes associated with the node extracted by the extraction unit 6d, and performs again the foregoing processes subsequent to the process of selecting nodes.

Returning to FIG. 6, the output control unit 6e outputs various kinds of information. For example, when the specification unit 6b determines that there is no node in which no degree of association is calculated, and when the extraction unit 6d determines that the newly specified degree of association is smaller than the previously specified degree of association, the output control unit 6e performs the following process. Specifically, the output control unit 6e transmits to the communication unit 4 the final summarized result together with an instruction for transmitting the final summarized result to the client 20. Accordingly, the communication unit 4 transmits the final summarized result to the client 20 via the network 40.

Figure 15:
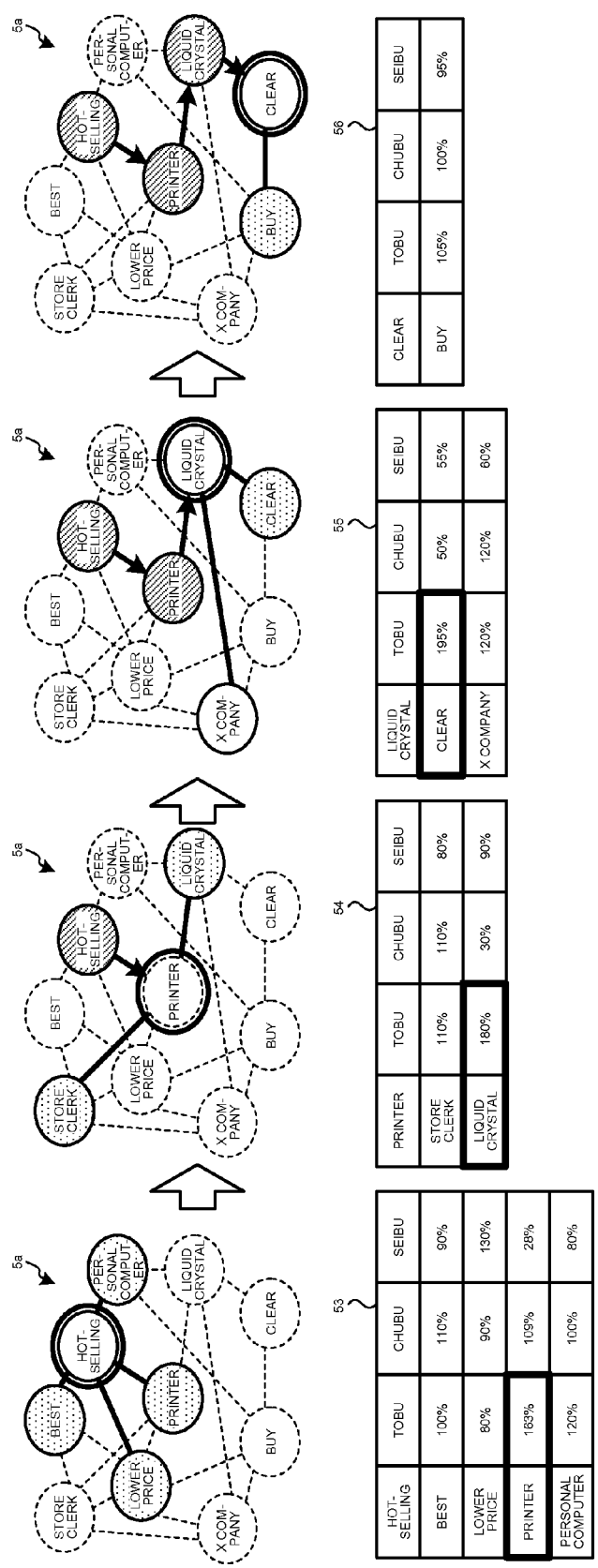
FIG. 15 is a diagram for describing one example of a process executed by a server.
Figure 16:
FIG. 16 is a diagram for describing one example of a process executed by the server.

In the server 1, when the selection unit 6a, the specification unit 6b, the calculation unit 6c, and the extraction unit 6d execute the foregoing processes, nodes with high degrees of association with the registered contents of the analysis target are sequentially extracted from the nodes specified in the vertical axis. FIGS. 15 and 16 are diagrams for describing one example of a process executed by the server. FIG. 15 provides one example of degrees of association 53 calculated by the calculation unit 6c from the summarized results of the nodes "best," "lower price," "printer," and "personal computer" selected by the selection unit 6a and the items "Tobu," "Chubu," and "Seibu." With regard to the degrees of association 53 in the example of FIG. 15, the extraction unit 6d specifies the highest degree of association "163%" out of the degrees of association between the nodes "best," "lower price," "printer," and "personal computer" and the registered content "Tobu" of the analysis target.

FIG. 15 provides another example of degrees of association 54 calculated by the calculation unit 6c from the summarized results of the nodes "store clerk" and "liquid crystal" selected by the selection unit 6a and the items "Tobu," "Chubu," and "Seibu." With regard to the degrees of association 54 in the example of FIG. 15, out of the degrees of association between the nodes "store clerk" and "liquid crystal" and the registered content "Tobu" of the analysis target, the highest degree of association "180%" is higher than the previously specified degree of association "163%." Thus, the extraction unit 6d performs the following process. Specifically, the extraction unit 6d specifies the degree of association "180%."

FIG. 15 provides another example of degrees of association 55 calculated by the calculation unit 6c from the summarized results of the nodes "clear" and "X Company" selected by the selection unit 6a and the items "Tobu," "Chubu," and "Seibu." With regard to the degrees of association 55 illustrated in the example of FIG. 5, out of the degrees of association between the nodes "clear" and "X Company" and the registered content "Tobu" of the analysis target, the highest degree of association "195%" is higher than the previously specified degree of association "180%." Thus, the extraction unit 6d performs the following process. Specifically, the extraction unit 6d specifies the degree of association "195%."

FIG. 15 provides another example of degrees of association 56 calculated by the calculation unit 6c from the summarized results of the node "buy" selected by the selection unit 6a and the items "Tobu," "Chubu," and "Seibu." As illustrated in the example of FIG. 15, the degrees of association with the node "personal computer" adjacent to the node "liquid crystal" are already calculated, and thus the degrees of association 56 do not include the degrees of association with the node "personal computer." With regard to the degrees of association 56 in the example of FIG. 15, the degree of association "105%" between the node "buy" and the registered content "Tobu" of the analysis target is smaller than the previously specified degree of association "195%." Thus, the output control unit 6e performs the following process. Specifically, the output control unit 6e transmits to the communication unit 4 the final summarized result 60 illustrated in FIG. 16 together with an instruction for transmitting the final summarized result 60 to the client 20. Accordingly, the final summarized result 60 is displayed on the client 20.

The control unit 6 is an integrated circuit such as an application specific integrated circuit (ASIC). The control unit 6 may also be a field programmable gate array (FPGA). The control unit 6 may also be an electronic circuit such as a central processing unit (CPU). The control unit 6 may also be a micro processing unit (MPU).

Figure 17:
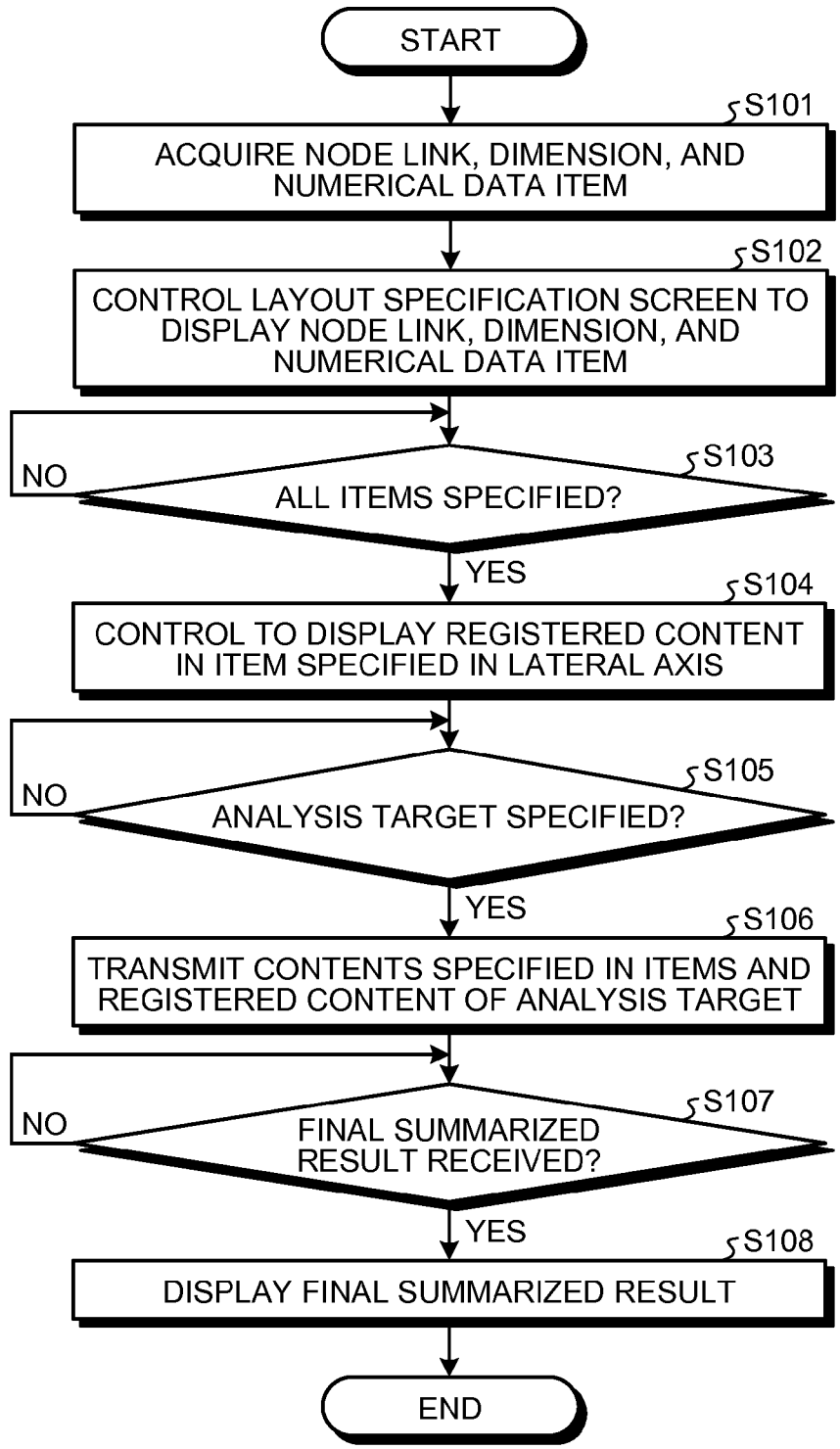
FIG. 17 is a flow chart of a layout specification process according to example 1.

Next, a flow of a process executed by the client 20 according to the example will be described. FIG. 17 is a flow chart of a layout specification process according to example 1. For example, the layout specification process is executed when an instruction for executing the layout specification process is input from the input unit 21 to the control unit 25.

As illustrated in FIG. 17, the layout specification unit 25a acquires the node link 24a, the dimension 24b, and the numerical data item 24c from the storage unit 24 (S101). Then, the layout specification unit 25a controls the display unit 22 to display the layout specification screen 26, the node link 24a, the dimension 24b, and the numerical data item 24c, as illustrated in the example of FIG. 5 (S102).

Then, the layout specification unit 25a determines whether corresponding contents are specified by a user for all the items "vertical axis," "lateral axis," and "summation" (S103). When no contents are specified (S103: No), the layout specification unit 25a makes again the determination at S103. Meanwhile, when the contents are specified (S103: Yes), the layout specification unit 25a controls the display unit 22 to display the registered contents for the items specified in "lateral axis" in the table 30a (S104).

Then, the layout specification unit 25a determines whether the registered content of the analysis target is specified by the user (S105). When no registered content is specified (S105: No), the layout specification unit 25a makes again the determination at S105. Meanwhile, when the registered content is specified (S105: Yes), the layout specification unit 25a performs the following process. Specifically, the layout specification unit 25a transmits to the communication unit 23 the contents specified for the items "vertical axis," "lateral axis," and "summation" on the layout specification screen 26, the specified registered content of the analysis target, and an instruction for transmission to the server 1 (S106).

Then, the layout specification unit 25*a* determines whether a final summarized result described later is received from the server 1 (S107). When the result is not received (S107: No), the layout specification unit 25*a* makes again the determination at S107. When the result is received (S107: Yes), the output control unit 25*b* controls the display unit 22 to display the received final summarized result (S108) and then terminates the process.

Figure 18:
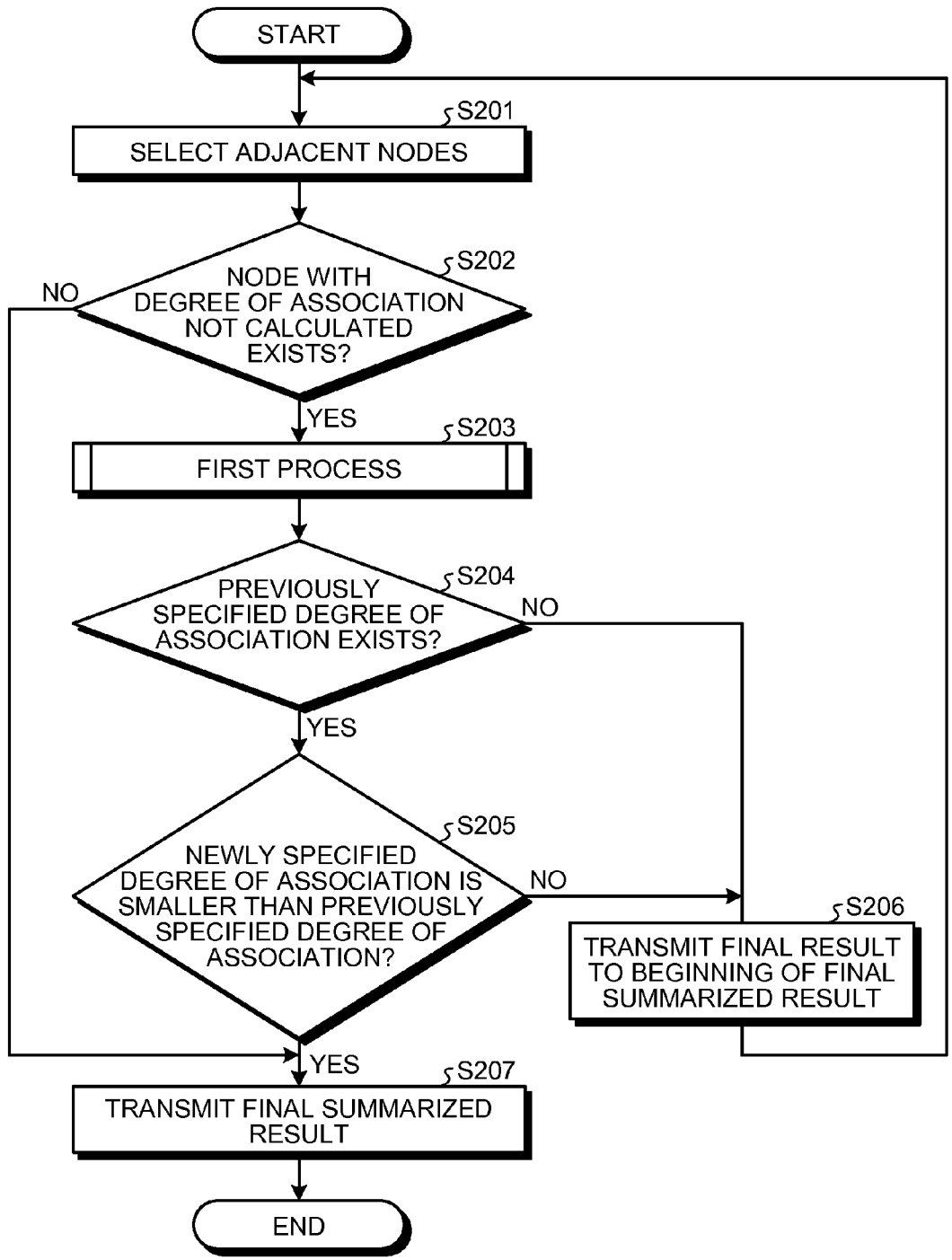
FIG. 18 is a flow chart of a node extraction process according to example 1.

Next, a flow of a node extraction process executed by the server 1 according to the example will be described. FIG. 18 is a flow chart of a node extraction process according to example 1. For example, the node extraction process is executed when the contents specified for the items "vertical axis," "lateral axis," and "summation" on the layout specification screen 26 and the registered content of the analysis target are accepted by the communication unit 4.

As illustrated in FIG. 18, the selection unit 6*a* selects nodes adjacent to the node accepted by the communication unit 4 and nodes adjacent to the node extracted by the extraction unit 6*d* (S201). The specification unit 6*b* determines whether, of the nodes selected by the selection unit 6*a*, there is any node of which no degree of association is calculated by the calculation unit 6*c* described later (S202).

Figure 19:
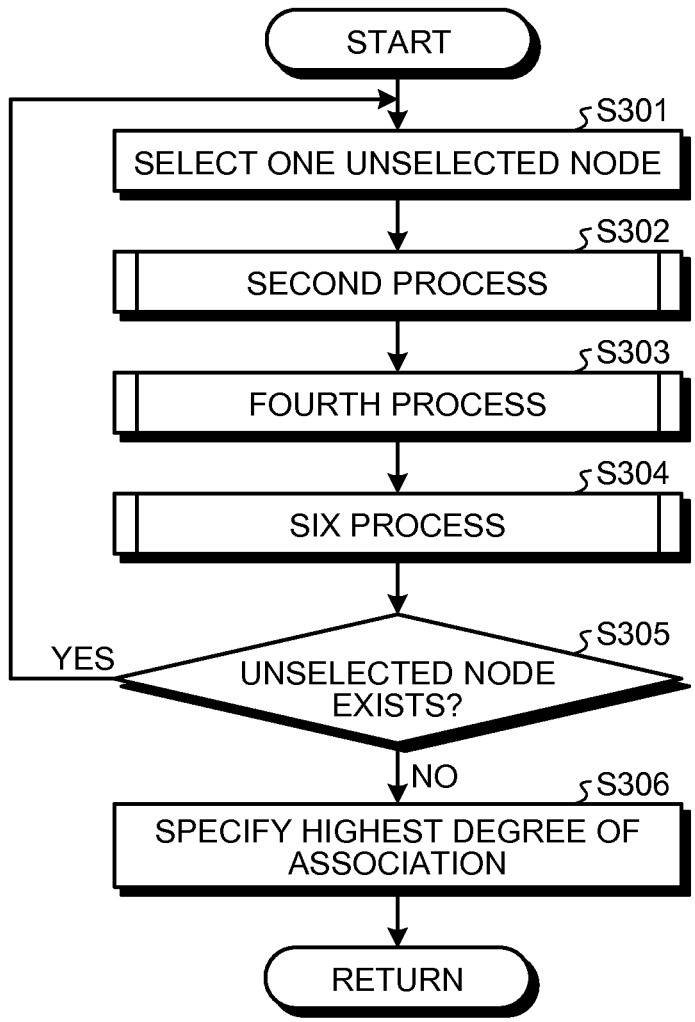
FIG. 19 is a flow chart of a first process according to example 1.

When there is any node with the degree of association not calculated (S202: Yes), the specification unit 6*b* executes a first process (S203). FIG. 19 is a flow chart of a first process according to example 1. As illustrated in FIG. 19, the specification unit 6*b* selects one unselected node from among the nodes selected by the selection unit 6*a* (S301).

Figure 20:
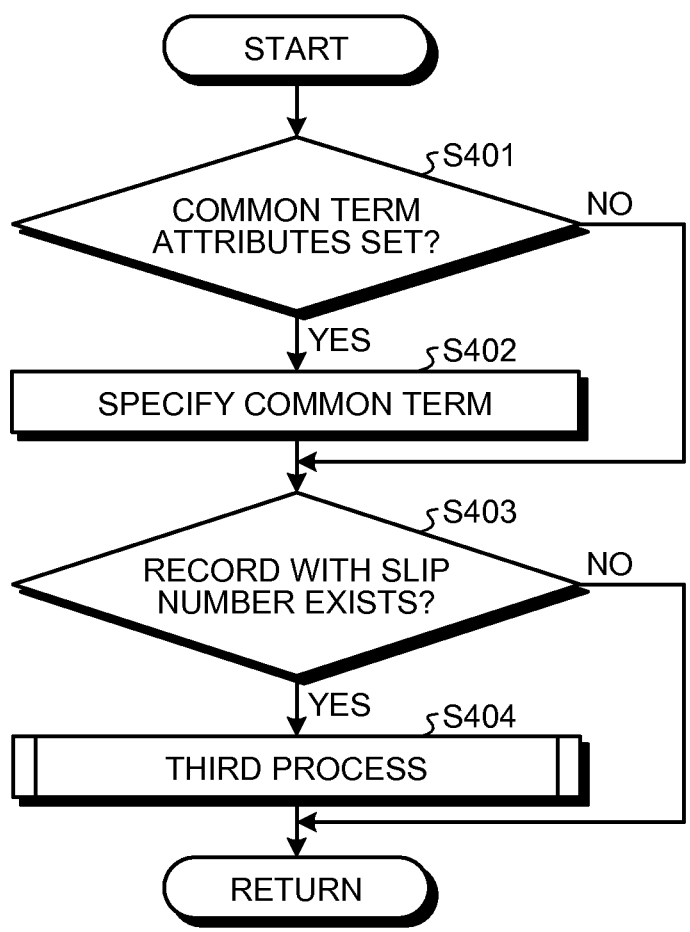
FIG. 20 is a flow chart of a second process according to example 1.

Then, the specification unit 6*b* executes a second process (S302). FIG. 20 is a flow chart of a second process according to example 1. As illustrated in FIG. 20, the specification unit 6*b* determines whether common term attributes are set to the selected nodes (S401).

When no common term attributes are set to the selected nodes (S401: No), the specification unit 6*b* moves to S403. Meanwhile, when common term attributes are set to the selected nodes (S401: Yes), the specification unit 6*b* specifies common terms indicated by the set common term attributes (items and registered contents) (S402). Then, the specification unit 6*b* determines whether the table 30*a* includes any records having slip numbers in the questionnaires 92 in which the selected nodes are described in the answer column (S403).

Figure 21:
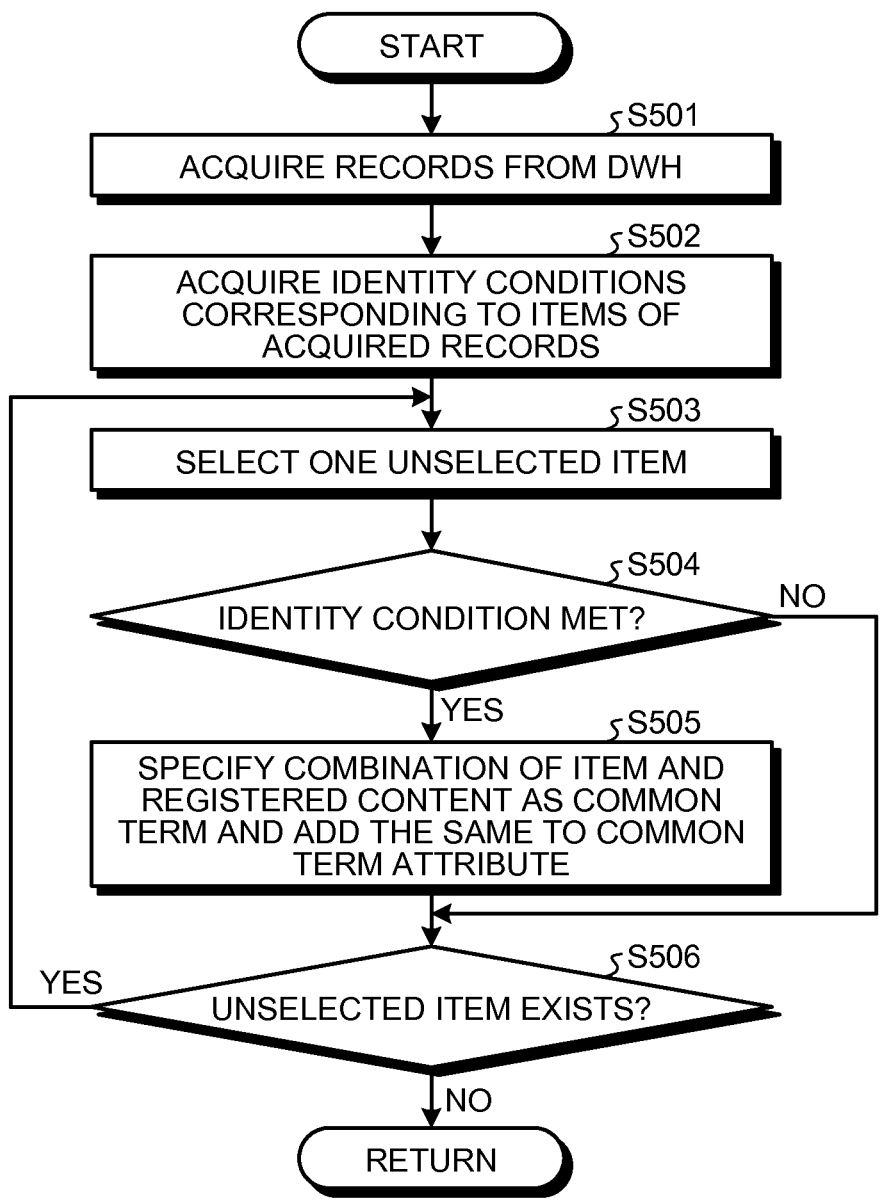
FIG. 21 is a flow chart of a third process according to example 1.

When there are no records (S403: No), the specification unit 6*b* stores the processing result in the internal memory and returns the process. Meanwhile, when there are any records (S403: Yes), the specification unit 6*b* executes a third process (S404), stores the processing result in the internal memory, and returns the process. FIG. 21 is a flow chart of a third process according to example 1. As illustrated in FIG. 21, the specification unit 6*b* instructs the communication unit 4 to transmit to the DWH 30 the slip numbers in the questionnaires 92 in which the selected nodes are described in the answer column, and acquires the records from the DWH 30 (S501).

Subsequently, the specification unit 6*b* acquires the identity conditions 5*c* for the items of the acquired records (S502). Subsequently, the specification unit 6*b* selects one unselected item out of the items of the acquired records (S503).

Subsequently, the specification unit 6*b* determines whether the registered contents in the selected item of all the acquired records meet the corresponding identity conditions 5*c* (S504).

When at least one or more of the registered contents in the selected item of all the acquired records do not meet the corresponding identity conditions 5*c* (S504: No), the specification unit 6*b* moves to S506. Meanwhile, when the registered contents in the selected item of all the acquired records meet the corresponding identity conditions 5*c* (S504: Yes), the specification unit 6*b* performs the following process. Specifically, the specification unit 6*b* specifies a combination of the selected item and the registered contents in the selected item as a common term, and sets the specified common term as a common term attribute of the selected node (S505).

Then, the specification unit 6*b* determines whether any unselected item is included in the items of the acquired records (S506). When there is any unselected item (S506: Yes), the specification unit 6*b* returns to S503. Meanwhile, when there is no unselected item (S506: No), the specification unit 6*b* stores the processing result in the internal memory and returns the process.

Figure 22:
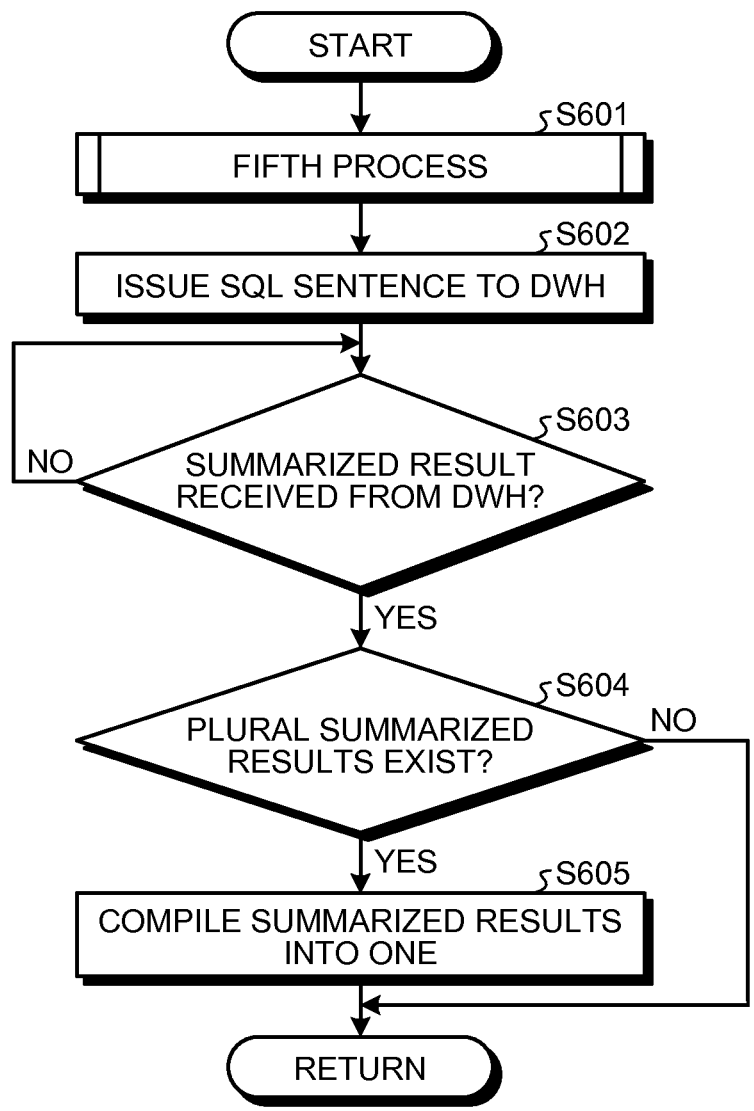
FIG. 22 is a flow chart of a fourth process according to example 1.
Figure 23:
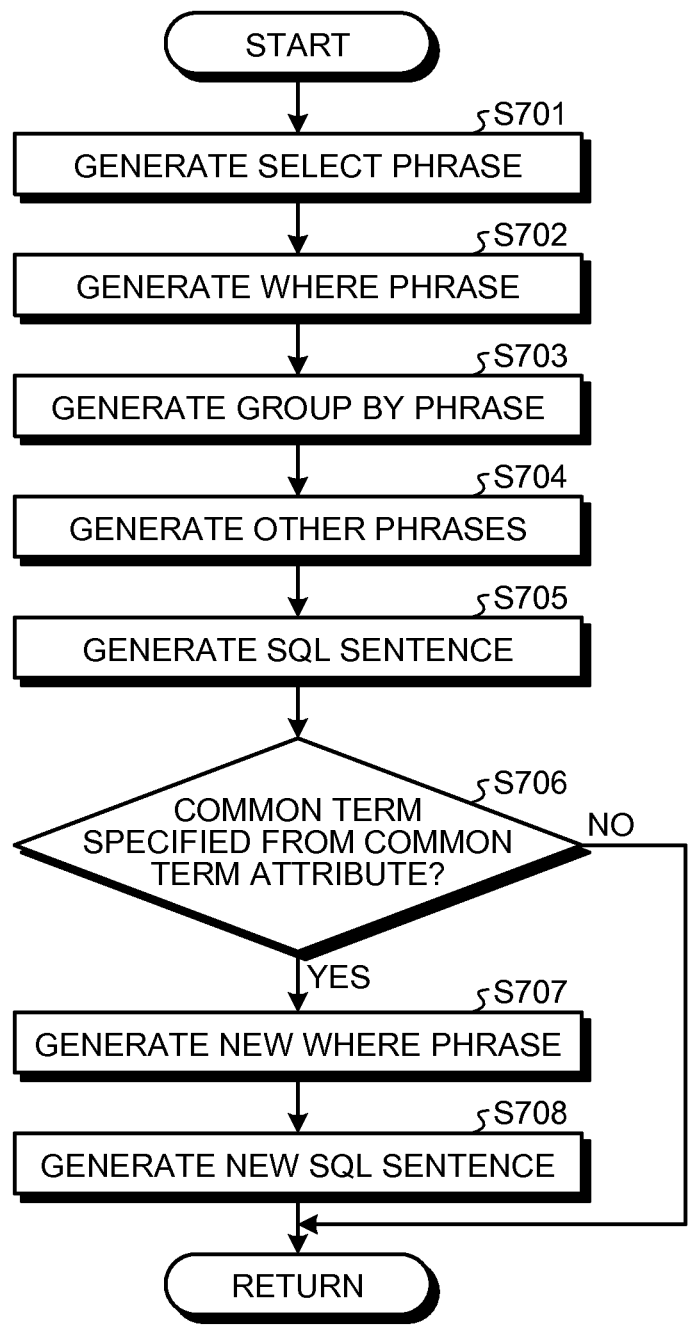
FIG. 23 is a flow chart of a fifth process according to example 1.

Returning to FIG. 19, the calculation unit 6*c* executes a fourth process (S303). FIG. 22 is a flow chart of a fourth process according to example 1. As illustrated in FIG. 22, the calculation unit 6*c* executes a fifth process (S601). FIG. 23 is a flow chart of a fifth process according to example 1. As illustrated in FIG. 23, the calculation unit 6*c* generates a SELECT phrase in which the total of the registered contents of the items for use in calculating the degree of association is designated as "SELECT" (S701). Subsequently, the calculation unit 6*c* generates a WHERE phrase in which the common term specified by the specification unit 6*b* is designated as "WHERE" (S702).

Then, the calculation unit 6*c* generates a "GROUP BY" phrase in which the item of the analysis target is designated as "GROUP BY" (S703). Subsequently, the calculation unit 6*c* generates other phrases, for example, the phrase "FROM Table 30*a*" (S704). After that, the calculation unit 6*c* uses the generated SELECT phrase, WHERE phrase, "GROUP BY" phrase, and other phrases to generate a SQL sentence including the newly specified common term in the WHERE phrase (S705).

Subsequently, the calculation unit 6*c* determines whether any common term is specified by the specification unit 6*b* from the common term attributes set to the nodes (S706). When no common term is specified (S706: No), the calculation unit 6*c* stores the processing result in the internal memory and returns the process. Meanwhile, when any common term is specified (S706: Yes), the calculation unit 6*c* generates a new WHERE phrase in which the common term specified by the specification unit 6*b* from the common term attributes set to the nodes is designated as "WHERE" (S707). After that, the calculation unit 6*c* uses the newly generated WHERE phrase, the generated SELECT phrase, the "GROUP BY" phrase, and other phrases to generate a new SQL sentence including the common term specified from the common term attributes set to the nodes in the WHERE phrase (S708). Then, the calculation unit 6*c* stores the processing result in the internal memory and returns the process.

Returning to FIG. 22, the calculation unit 6*c* instructs the communication unit 4 to transmit each of the generated SQL sentences to the DWH 30, thereby to issue the SQL sentences to the DWH 30 (S602).

Subsequently, the calculation unit 6*c* determines whether all the summarized result(s) corresponding to all the transmitted SQL sentences are received from the DWH 30 (S603). When all the summarized result(s) are not received (S603: No), the calculation unit 6*c* performs again the determination at S603. Meanwhile, when all the summarized result(s) are received (S603: Yes), the calculation unit 6*c* determines whether the received summarized results are plural (S604). When the received summarized result is not plural (S604: No), the calculation unit 6c stores the processing result in the internal memory and returns the process. Meanwhile, when the received summarized results are plural (S604: Yes), the calculation unit 6c compiles the plurality of received summarized results into one (S605), stores the processing result in the internal memory, and returns the process.

Figure 24:
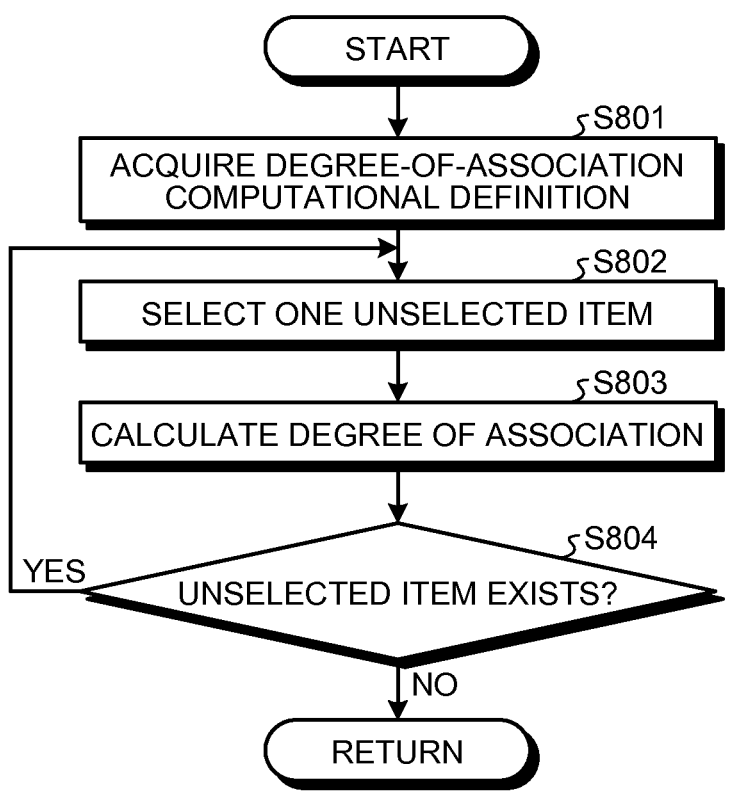
FIG. 24 is a flow chart of a sixth process according to example 1.

Returning to FIG. 19, the calculation unit 6c executes a sixth process (S304). FIG. 24 is a flow chart of a sixth process according to example 1. As illustrated in FIG. 24, the calculation unit 6c acquires the degree-of-association computational definition 5b (S801). Subsequently, the calculation unit 6c selects one unselected item from among the items of the received summarized result (when the received summarized results are plural, the compiled summarized results compiled into one) (S802).

Then, the calculation unit 6c uses an algorithm indicated by the degree-of-association computational definition 5b to calculate the degree of association between the selected item and the selected node (S803). Subsequently, the calculation unit 6c determines whether any unselected item is included in the items of the received summarized result (S804). When there is any unselected item (S804: Yes), the calculation unit 6c returns to S802. Meanwhile, when there is no unselected item (S804: No), the calculation unit 6c stores the processing result in the internal memory and returns the process.

Returning to FIG. 19, the calculation unit 6c determines whether any unselected node is included in the nodes selected by the selection unit 6a (S305). When there is any unselected node (S305: Yes), the calculation unit 6c returns to S301. Meanwhile, there is no unselected item (S305: No), the extraction unit 6d specifies the highest degree of association out of the degrees of association between the nodes selected by the selection unit 6a and the registered content of the analysis target (S306). Then, the extraction unit 6d stores the processing result in the internal memory and returns the process.

Returning to FIG. 18, the extraction unit 6d determines whether there is any degree of association specified earlier than the newly specified degree of association (S204). When there is any degree of association specified earlier than the newly specified degree of association (S204: Yes), the extraction unit 6d determines whether the newly specified degree of association is smaller than the previously specified degree of association (S205). When the newly specified degree of association is equal to or more than the previously specified degree of association (S205: No), the extraction unit 6d performs the following process. Specifically, the extraction unit 6d extracts a node corresponding to the newly specified degree of association, adds records of the summarized result with the extracted node in the vertical axis and the item of the analysis target in the lateral axis to the beginning of the final summarized result (S206), and returns to S201. When there is no degree of association specified earlier than the newly specified degree of association (S204: No), the extraction unit 6d also returns to S206.

Meanwhile, when there is no node with the degree of association not calculated (S202: No) and when the newly specified degree of association is smaller than the previously specified degree of association (S205: Yes), the output control unit 6e performs the following process. Specifically, the output control unit 6e transmits to the communication unit 4 the final summarized result together with an instruction for transmitting the final summarized result to the client 20 (S207). Then, the output control unit 6e terminates the process.

As described above, the server 1 according to the example selects nodes associated with the accepted node and nodes associated with the extracted node. Then, the server 1 calculates the following degree of association for each of the registered contents in the item in which the registered content of the analysis target in the table 30a is registered, according to the registered contents in the items for use in calculating the degree of association in the table 30a. Specifically, the server 1 calculates the degrees of association between the registered contents in the item in the table 30a in which the registered content of the analysis target is registered and the selected node. Subsequently, the server 1 extracts nodes associated with the analysis target from the selected nodes according to the calculated degrees of association. In this manner, the server 1 according to example 1 automatically extracts nodes associated with a specific node and associated with the analysis target. Therefore, the server 1 according to example 1 makes it possible to extract accurately nodes associated with a specific node and associated with the analysis target.

The server 1 also specifies as a common term an item satisfying a predetermined commonality between the records (in the table 30a) having slip numbers in the questionnaires 92 in which a selected node is described in the answer column. In addition, the server 1 also specifies the registered content of the specified common term. Then, the server 1 calculates the degree of association according to the registered contents in the item for use in calculating the degree of association included in the record including the specified common term. In this manner, the server 1 extends records of a target for calculating the degree of association, to not only the records having slip numbers in the questionnaires 92 in which the selected node is described in the answer column but also all the records including the common term. Therefore, the server 1 makes it possible to calculate the degree of association with accuracy by targeting all the records including the common term.

As in the foregoing, examples of the system and device disclosed herein are described. However, the present invention can be carried out in various different modes other than the foregoing examples.

For instance, out of the processes described above in relation to the examples, all or some processes described as being automatically performed may be manually performed. In addition, out of the processes described above in relation to the examples, all or some processes described as being manually performed may be automatically performed by a publicly-known method.

Depending on various loads, use conditions, and the like, the steps of the processes described above in relation to the examples may be arbitrarily subdivided or combined. In addition, the steps may be omitted.

Depending on various loads, use conditions, and the like, the order of the steps of the processes described above in relation to the examples may be changed.

The constitutional elements of the devices illustrated in the drawings refer to functional concepts and there are cases where the constitutional elements of the devices is not physically configured in the illustrated manners. Specifically, the specific states of dispersion and integration of the devices are not limited to those illustrated in the drawings, but all or some of the constitutional elements may be functionally or physically dispersed or integrated in an arbitrary unit, depending on various loads, use conditions, and the like.

Node Extraction Program

Figure 25:
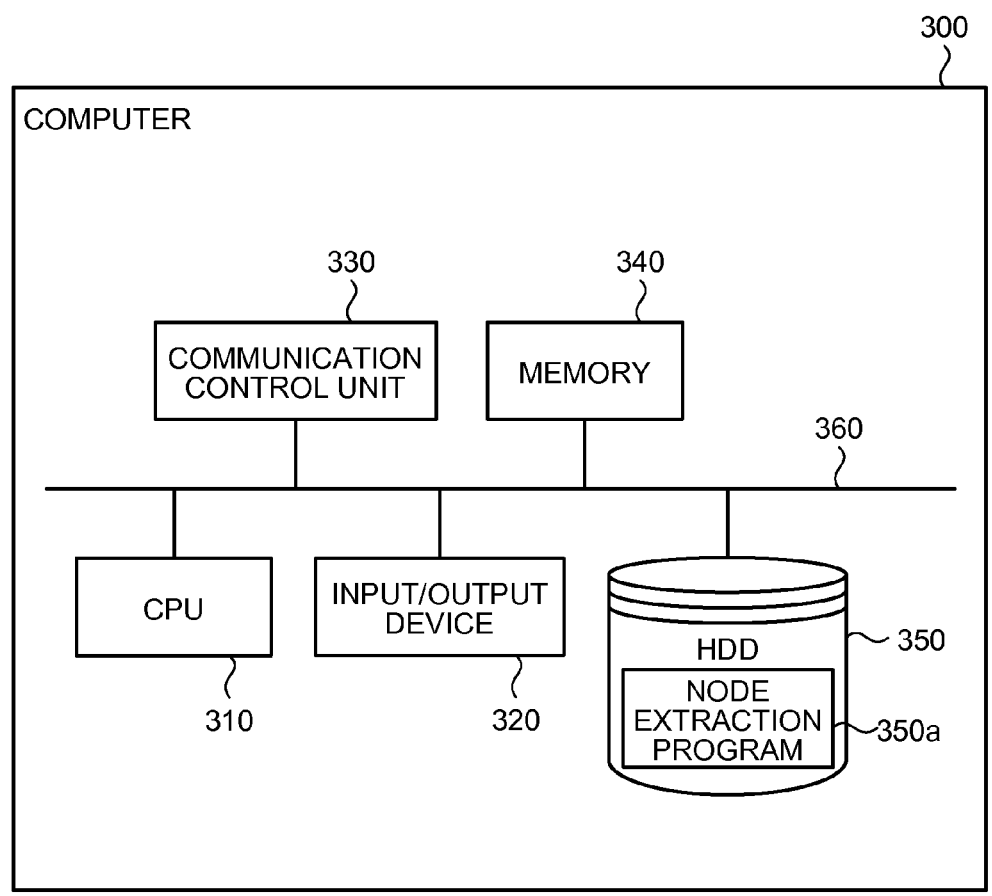
FIG. 25 is a diagram illustrating a computer executing a node extraction program.
Figure 26:
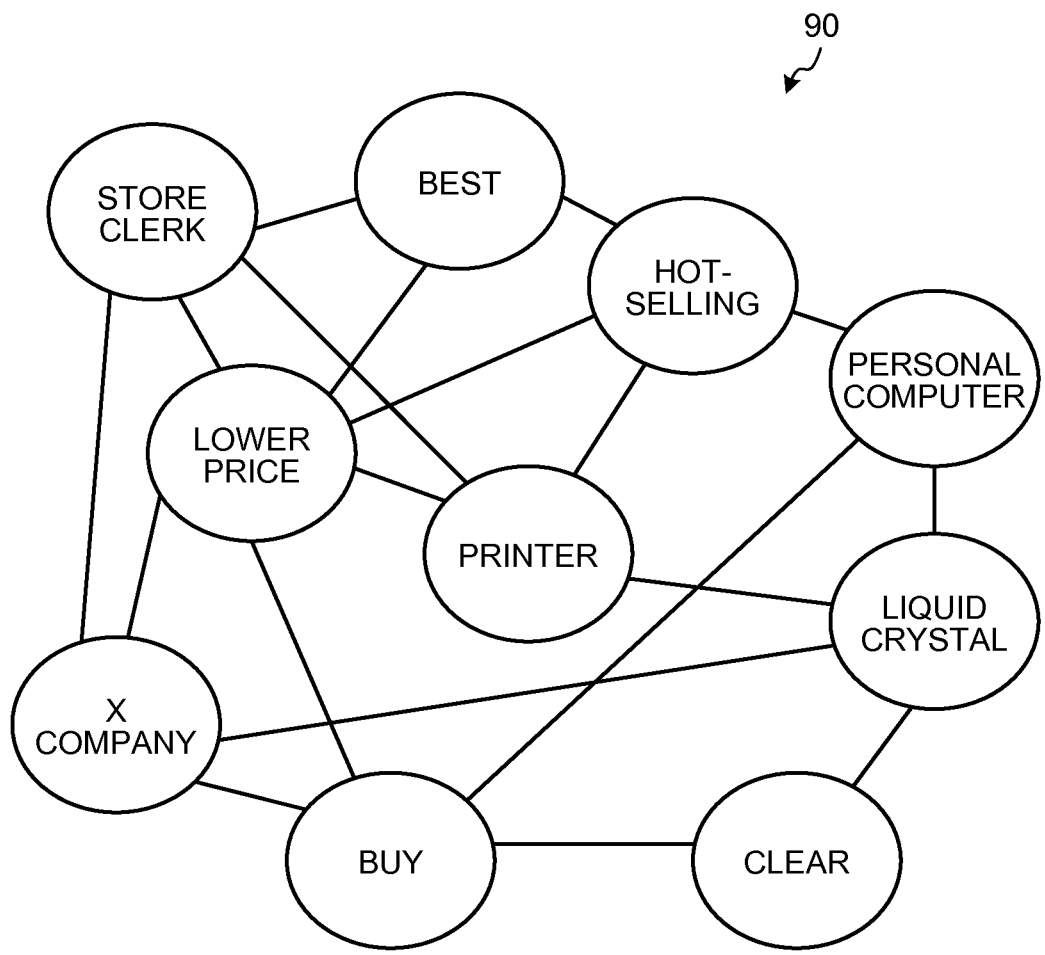
FIG. 26 is a diagram illustrating one example of an operation performed by a user.

The various processes by the server 1 described above in relation to the examples and the modification examples can also be realized by executing a prepared node extraction program on a personal computer or a computer system such as a work station. Thus, one example of a computer executing a node extraction program having the same functions as those of the server 1 described above in relation to example 1 will be described below with reference to FIG. 25. FIG. 25 is a diagram illustrating a computer executing the node extraction program.

As illustrated in FIG. 29, a computer 300 has a CPU 310, an input/output device 320, a communication control unit 330, a memory 340, and a hard disk drive (HDD) 350. The CPU 310, the input/output device 320, the communication control unit 330, the memory 340, and the HDD 350 are connected together via a bus 360.

The HDD 350 stores basic programs such as an OS. The HDD 350 also stores in advance a node extraction program 350a performing the same functions as those of the selection unit 6a, the specification unit 6b, the calculation unit 6c, the extraction unit 6d, and the output control unit 6e described above in relation to the examples. The node extraction program 350a may be separated as appropriate. The HDD 350 is provided with a node link, a degree-of-association computational definition, and an identity condition. The node link, the degree-of-association computational definition, and the identity condition correspond to the node link 5a, the degree-of-association computational definition 5b, and the identity condition 5c described above.

Then, the CPU 310 reads the node extraction program 350a from the HDD 350 and executes the same.

Then, the CPU 310 reads the node link, the degree-of-association computational definition, and the identity condition and stores the same in the memory 340. The CPU 310 uses the node link, the degree-of-association computational definition, and the identity condition stored in the memory 340 to execute the node extraction program 350a. Data to be stored in the memory 340 is not always stored in the memory 340, but only data for use in the processes may be stored in the memory 340.

There are cases where the node extraction program 350a is not stored in the HDD 350 from the beginning.

For example, the node extraction program 350a may be stored in a "portable physical medium" such as a flexible disk (FD), CD-ROM, DVD disk, magneto-optical disk, or IC card to be inserted into the computer 300, so that the computer 300 reads the node extraction program 350a from the medium and executes the same.

Further, the node extraction program 350a may be stored in "another computer (or server)" connected to the computer 300 via a public line, the Internet, a LAN, a WAN, or the like, so that the computer 300 reads the node extraction program 350a from the computer or server and executes the same.

According to the present invention, it is possible to accurately extract a node associated with a specific node and an analysis target.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device, comprising:
a memory; and
a processor coupled to the memory, wherein the processor executes a process comprising:
selecting nodes associated with an extracted node and a node associated with the node accepted by an acceptance unit accepting a node from nodes included in a node link obtained from text relating to a specific matter, accepting a first item in which a registered content of an analysis target is registered, from items in a table relating to the specific matter, and accepting the registered content of the analysis target, a second item for use in calculating degrees of association between registered contents in the first item in the table and nodes;
calculating the degrees of association between each of the registered content in the first item in the table and the nodes selected, according to a registered content in the second item in the table; and
extracting a node associated with the analysis target from the selected nodes, according to the calculated degrees of association.

2. The information processing device according to claim 1, the process further comprising:
specifying an item satisfying a predetermined commonality between records in the table corresponding to text including nodes selected and a registered content in the item, wherein
the calculating the degrees of association between each of the registered contents in the first item in the table and the nodes selected, according to the registered content in the second item included in records including the item and the registered content in the item specified.

3. The information processing device according to claim 1, wherein
the selecting includes selecting nodes associated with the extracted node, each time the node is extracted at the extracting,
the calculating includes calculating the degree of association between each of the registered contents in the first item in the table and each of the nodes selected, and
the extracting includes extracting, as a node associated with the analysis target, a node with the degree of association that is highest among the degrees of association calculated for each of the nodes selected and is higher than the degree of association calculated for the previously extracted node.

4. The information processing device according to claim 1, the process further comprising:
outputting information on the nodes extracted.

5. A non-transitory computer-readable recording medium having stored therein a node extraction program that causes a computer to execute a process comprising:
selecting nodes associated with an extracted node and a node associated with the node accepted by an acceptance unit accepting a node from nodes included in a node link obtained from text relating to a specific matter, accepting a first item in which a registered content of an analysis target is registered, from items in a table relating to the specific matter, accepting the registered content of the analysis target, a second item for use in calculating degrees of association between registered contents in the first item in the table and nodes;
calculating the degrees of association between each of the registered content in the first item in the table and the nodes selected, according to a registered content in the second item in the table; and extracting a node associated with the analysis target from the selected nodes, according to the calculated degrees of association.

6. A node extraction method executed by a computer, the node extraction method comprising:

selecting nodes associated with an extracted node and a node associated with the node accepted by an acceptance unit accepting a node from nodes included in a node link obtained from text relating to a specific matter, accepting a first item in which a registered content of an analysis target is registered, from items in a table relating to the specific matter, accepting the registered content of the analysis target, a second item for use in calculating degrees of association between registered contents in the first item in the table and nodes, using a processor;

calculating the degrees of association between each of the registered content in the first item in the table and the nodes selected, according to a registered content in the second item in the table, using the processor; and extracting a node associated with the analysis target from the selected nodes, according to the calculated degrees of association, using the processor.

* * * * *